US010261994B2

(12) United States Patent
Marcu et al.

(10) Patent No.: US 10,261,994 B2
(45) Date of Patent: Apr. 16, 2019

(54) METHOD AND SYSTEM FOR AUTOMATIC MANAGEMENT OF REPUTATION OF TRANSLATORS

(75) Inventors: Daniel Marcu, Manhattan Beach, CA (US); Markus Dreyer, Santa Monica, CA (US)

(73) Assignee: SDL Inc., Wakefield, MA (US)

( * ) Notice: Subject to any disclaimer, the term of this patent is extended or adjusted under 35 U.S.C. 154(b) by 598 days.

(21) Appl. No.: 13/481,561

(22) Filed: May 25, 2012

(65) Prior Publication Data

US 2014/0188453 A1  Jul. 3, 2014

(51) Int. Cl.
*G06F 17/28* (2006.01)
*G06Q 10/06* (2012.01)

(52) U.S. Cl.
CPC ..... *G06F 17/2854* (2013.01); *G06Q 10/0639* (2013.01)

(58) Field of Classification Search
USPC .......... 704/2, 3, 4, 9, 260; 434/353; 707/728
See application file for complete search history.

(56) References Cited

U.S. PATENT DOCUMENTS

| | | |
|---|---|---|
| 4,055,907 A | 11/1977 | Henson |
| 4,502,128 A | 2/1985 | Okajima et al. |
| 4,509,137 A | 4/1985 | Yoshida |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

Fuji Ren and Shi Hongchi, "Parallel machine translation: principles and practice." Proceedings of the Seventh IEEE International Conference on Engineering of Complex Computer Systems, 2001.*

(Continued)

*Primary Examiner* — Neeraj Sharma
(74) *Attorney, Agent, or Firm* — Carr & Ferrell LLP

(57) ABSTRACT

The present invention provides a method that includes receiving a result word set in a target language representing a translation of a test word set in a source language. When the result word set is not in a set of acceptable translations, the method includes measuring a minimum number of edits to transform the result word set into a transform word set. The transform word set is in the set of acceptable translations. A system is provided that includes a receiver to receive a result word set and a counter to measure a minimum number of edits to transform the result word set into a transform word set. A method is provided that includes automatically determining a translation ability of a human translator based on a test result. The method also includes adjusting the translation ability of the human translator based on historical data of translations performed by the human translator.

22 Claims, 13 Drawing Sheets

(56) References Cited

U.S. PATENT DOCUMENTS

| | | |
|---|---|---|
| 4,814,987 A | 3/1989 | Miyao et al. |
| 4,845,658 A | 7/1989 | Gifford |
| 4,916,614 A | 4/1990 | Kaji |
| 4,920,499 A | 4/1990 | Skeirik |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,175,684 A | 12/1992 | Chong |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,275,569 A | 1/1994 | Watkins |
| 5,295,068 A | 3/1994 | Nishino et al. |
| 5,302,132 A | 4/1994 | Corder |
| 5,311,429 A | 5/1994 | Tominaga |
| 5,351,189 A | 9/1994 | Doi |
| 5,387,104 A | 2/1995 | Corder |
| 5,418,717 A | 5/1995 | Su et al. |
| 5,432,948 A | 7/1995 | Davis et al. |
| 5,442,546 A | 8/1995 | Kaji et al. |
| 5,458,425 A | 10/1995 | Torok |
| 5,477,450 A | 12/1995 | Takeda et al. |
| 5,477,451 A | 12/1995 | Brown et al. |
| 5,488,725 A | 1/1996 | Turtle et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,587,902 A | 12/1996 | Kugimiya |
| 5,640,575 A | 6/1997 | Maruyama |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,708,780 A | 1/1998 | Levergood et al. |
| 5,715,314 A | 2/1998 | Payne et al. |
| 5,724,424 A | 3/1998 | Gifford |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,812,776 A | 9/1998 | Gifford |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,850,561 A | 12/1998 | Church et al. |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,873,056 A | 2/1999 | Liddy |
| 5,893,134 A | 4/1999 | O'Donoghue et al. |
| 5,903,858 A | 5/1999 | Saraki |
| 5,907,821 A | 5/1999 | Kaji et al. |
| 5,909,492 A | 6/1999 | Payne et al. |
| 5,909,681 A | 6/1999 | Passera et al. |
| 5,917,944 A * | 6/1999 | Wakisaka ............ G06F 17/2755 382/190 |
| 5,930,746 A | 7/1999 | Ting |
| 5,960,384 A * | 9/1999 | Brash ............................... 704/9 |
| 5,963,205 A | 10/1999 | Sotomayor |
| 5,966,685 A | 10/1999 | Flanagan et al. |
| 5,974,372 A | 10/1999 | Barnes |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,044,344 A | 3/2000 | Kanevsky |
| 6,047,252 A | 4/2000 | Kumano et al. |
| 6,049,785 A | 4/2000 | Gifford |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,085,162 A | 7/2000 | Cherny |
| 6,092,034 A | 7/2000 | McCarley et al. |
| 6,119,077 A | 9/2000 | Shinozaki |
| 6,119,078 A | 9/2000 | Kobayakawa et al. |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,026 B1 | 1/2001 | Tillmann et al. |
| 6,182,027 B1 | 1/2001 | Nasukawa et al. |
| 6,185,524 B1 | 2/2001 | Carus et al. |
| 6,195,649 B1 | 2/2001 | Gifford |
| 6,199,051 B1 | 3/2001 | Gifford |
| 6,205,437 B1 | 3/2001 | Gifford |
| 6,205,456 B1 | 3/2001 | Nakao |
| 6,206,700 B1 | 3/2001 | Brown et al. |
| 6,212,634 B1 | 4/2001 | Geer et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,279,112 B1 | 8/2001 | O'toole, Jr. et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,356,865 B1 | 3/2002 | Franz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,415,257 B1 | 7/2002 | Junqua |
| 6,449,599 B1 | 9/2002 | Payne et al. |
| 6,460,015 B1 | 10/2002 | Hetherington et al. |
| 6,470,306 B1 * | 10/2002 | Pringle et al. ..................... 704/3 |
| 6,473,729 B1 | 10/2002 | Gastaldo et al. |
| 6,473,896 B1 | 10/2002 | Hicken et al. |
| 6,477,524 B1 | 11/2002 | Taskiran |
| 6,480,698 B2 | 11/2002 | Ho et al. |
| 6,490,358 B1 | 12/2002 | Geer et al. |
| 6,490,549 B1 | 12/2002 | Ulicny et al. |
| 6,490,563 B2 | 12/2002 | Hon |
| 6,498,921 B1 | 12/2002 | Ho et al. |
| 6,502,064 B1 | 12/2002 | Miyahira et al. |
| 6,529,865 B1 | 3/2003 | Duan et al. |

(56) References Cited

U.S. PATENT DOCUMENTS

| | | |
|---|---|---|
| 6,535,842 B1 | 3/2003 | Roche et al. |
| 6,587,844 B1 | 7/2003 | Mohri |
| 6,598,046 B1 | 7/2003 | Goldberg et al. |
| 6,604,101 B1 | 8/2003 | Chan et al. |
| 6,609,087 B1 | 8/2003 | Miller et al. |
| 6,647,364 B1 | 11/2003 | Yumura et al. |
| 6,658,627 B1 | 12/2003 | Gallup |
| 6,691,279 B2 | 2/2004 | Yoden et al. |
| 6,704,741 B1 | 3/2004 | Lively, Jr. et al. |
| 6,745,161 B1 | 6/2004 | Arnold et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,865,528 B1 | 3/2005 | Huang |
| 6,885,985 B2 | 4/2005 | Hull |
| 6,901,361 B1 | 5/2005 | Portilla |
| 6,904,402 B1 | 6/2005 | Wang et al. |
| 6,910,003 B1 | 6/2005 | Arnold et al. |
| 6,920,419 B2 | 7/2005 | Kitamura |
| 6,952,665 B1 | 10/2005 | Shimomura et al. |
| 6,976,207 B1 | 12/2005 | Rujan |
| 6,983,239 B1 | 1/2006 | Epstein |
| 6,990,439 B2 | 1/2006 | Xun |
| 6,993,473 B2 | 1/2006 | Cartus |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,013,264 B2 | 3/2006 | Dolan |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,908 B1 | 4/2006 | Huang |
| 7,031,911 B2 | 4/2006 | Zhou et al. |
| 7,050,964 B2 | 5/2006 | Menzes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,124,092 B2 | 10/2006 | O'toole, Jr. et al. |
| 7,143,036 B2 | 11/2006 | Weise |
| 7,146,358 B1 | 12/2006 | Gravano et al. |
| 7,149,688 B2 | 12/2006 | Schalkwyk |
| 7,174,289 B2 | 2/2007 | Sukehiro |
| 7,177,792 B2 | 2/2007 | Knight et al. |
| 7,191,115 B2 | 3/2007 | Moore |
| 7,191,447 B1 | 3/2007 | Ellis et al. |
| 7,197,451 B1 | 3/2007 | Carter et al. |
| 7,200,550 B2 | 4/2007 | Menzes et al. |
| 7,206,736 B2 | 4/2007 | Moore |
| 7,207,005 B2 | 4/2007 | Laktritz |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,272,639 B1 | 9/2007 | Levergood et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,333,927 B2 | 2/2008 | Lee |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,353,165 B2 | 4/2008 | Zhou |
| 7,356,457 B2 | 4/2008 | Pinkham et al. |
| 7,369,984 B2 | 5/2008 | Fairweather |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,223 B2 | 6/2008 | Atkin |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,448,040 B2 | 11/2008 | Ellis et al. |
| 7,454,326 B2 | 11/2008 | Marcu et al. |
| 7,496,497 B2 | 2/2009 | Liu |
| 7,509,313 B2 | 3/2009 | Colledge |
| 7,516,062 B2 | 4/2009 | Chen et al. |
| 7,533,013 B2 | 5/2009 | Marcu |
| 7,536,295 B2 | 5/2009 | Cancedda et al. |
| 7,546,235 B2 | 6/2009 | Brockett et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,549 B2 | 11/2009 | Di Cristo et al. |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,668,782 B1 | 2/2010 | Reistad et al. |
| 7,680,646 B2 | 3/2010 | Lux-Pogodalla et al. |
| 7,680,647 B2 | 3/2010 | Moore |
| 7,689,405 B2 | 3/2010 | Marcu |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,865,358 B2 | 1/2011 | Green |
| 7,925,493 B2 | 4/2011 | Watanabe |
| 7,925,494 B2 | 4/2011 | Cheng et al. |
| 7,945,437 B2 | 5/2011 | Mount et al. |
| 7,957,953 B2 | 6/2011 | Moore |
| 7,974,833 B2 | 7/2011 | Soricut et al. |
| 7,974,976 B2 | 7/2011 | Yahia et al. |
| 7,983,896 B2 | 7/2011 | Ross et al. |
| 7,983,897 B2 | 7/2011 | Chin et al. |
| 8,060,360 B2 | 11/2011 | He |
| 8,078,450 B2 | 12/2011 | Anisimovich |
| 8,135,575 B1 | 3/2012 | Dean |
| 8,145,472 B2 | 3/2012 | Shore et al. |
| 8,195,447 B2 | 6/2012 | Anismovich |
| 8,214,196 B2 | 7/2012 | Yamada et al. |
| 8,219,382 B2 | 7/2012 | Kim et al. |
| 8,234,106 B2 | 7/2012 | Marcu et al. |
| 8,239,186 B2 | 8/2012 | Chin |
| 8,239,207 B2 | 8/2012 | Seligman et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,286,185 B2 | 10/2012 | Ellis et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,352,244 B2 | 1/2013 | Gao et al. |
| 8,364,463 B2 | 1/2013 | Miyamoto |
| 8,380,486 B2 | 2/2013 | Soricut et al. |
| 8,386,234 B2 | 2/2013 | Uchimoto et al. |

(56) References Cited

U.S. PATENT DOCUMENTS

| | | | |
|---|---|---|---|
| 8,423,346 B2 | 4/2013 | Seo et al. | |
| 8,433,556 B2 | 4/2013 | Fraser et al. | |
| 8,442,812 B2 | 5/2013 | Ehsani | |
| 8,442,813 B1 | 5/2013 | Popat | |
| 8,468,149 B1 | 6/2013 | Lung et al. | |
| 8,504,351 B2 | 8/2013 | Waibel et al. | |
| 8,521,506 B2 | 8/2013 | Lancaster et al. | |
| 8,527,260 B2 | 9/2013 | Best | |
| 8,543,563 B1 | 9/2013 | Nikoulina et al. | |
| 8,548,794 B2 | 10/2013 | Koehn | |
| 8,554,591 B2 | 10/2013 | Reistad et al. | |
| 8,594,992 B2 | 11/2013 | Kuhn et al. | |
| 8,600,728 B2 | 12/2013 | Knight et al. | |
| 8,606,900 B1 | 12/2013 | Levergood et al. | |
| 8,612,203 B2 | 12/2013 | Foster et al. | |
| 8,612,205 B2* | 12/2013 | Hanneman | G06F 17/2827 704/2 |
| 8,615,388 B2 | 12/2013 | Li | |
| 8,615,389 B1 | 12/2013 | Marcu | |
| 8,635,327 B1 | 1/2014 | Levergood et al. | |
| 8,635,539 B2 | 1/2014 | Young et al. | |
| 8,655,642 B2 | 2/2014 | Fux et al. | |
| 8,666,725 B2 | 3/2014 | Och | |
| 8,676,563 B2 | 3/2014 | Soricut et al. | |
| 8,688,454 B2 | 4/2014 | Zheng | |
| 8,694,303 B2 | 4/2014 | Hopkins et al. | |
| 8,725,496 B2 | 5/2014 | Zhao et al. | |
| 8,762,128 B1* | 6/2014 | Brants et al. | 704/2 |
| 8,768,686 B2 | 7/2014 | Sarikaya et al. | |
| 8,775,154 B2 | 7/2014 | Clinchant | |
| 8,818,790 B2 | 8/2014 | He et al. | |
| 8,825,466 B1 | 9/2014 | Wang et al. | |
| 8,831,928 B2 | 9/2014 | Marcu et al. | |
| 8,843,359 B2 | 9/2014 | Lauder | |
| 8,862,456 B2 | 10/2014 | Krack et al. | |
| 8,886,515 B2 | 11/2014 | Van Assche | |
| 8,886,517 B2 | 11/2014 | Soricut et al. | |
| 8,886,518 B1 | 11/2014 | Wang et al. | |
| 8,898,052 B2 | 11/2014 | Waibel | |
| 8,903,707 B2 | 12/2014 | Zhao | |
| 8,930,176 B2 | 1/2015 | Li | |
| 8,935,148 B2 | 1/2015 | Christ | |
| 8,935,149 B2 | 1/2015 | Zhang | |
| 8,935,150 B2 | 1/2015 | Christ | |
| 8,935,706 B2 | 1/2015 | Ellis et al. | |
| 8,942,973 B2 | 1/2015 | Viswanathan | |
| 8,943,080 B2 | 1/2015 | Marcu et al. | |
| 8,972,268 B2 | 3/2015 | Waibel | |
| 8,977,536 B2 | 3/2015 | Och | |
| 8,990,064 B2 | 3/2015 | Marcu et al. | |
| 9,026,425 B2 | 5/2015 | Nikoulina | |
| 9,053,202 B2 | 6/2015 | Viswanadha | |
| 9,081,762 B2 | 7/2015 | Wu et al. | |
| 9,122,674 B1 | 9/2015 | Wong et al. | |
| 9,141,606 B2 | 9/2015 | Marciano | |
| 9,152,622 B2 | 10/2015 | Marcu et al. | |
| 9,176,952 B2 | 11/2015 | Aikawa | |
| 9,183,192 B1 | 11/2015 | Ruby, Jr. | |
| 9,183,198 B2 | 11/2015 | Shen et al. | |
| 9,197,736 B2* | 11/2015 | Davis | G06F 3/04842 |
| 9,201,870 B2 | 12/2015 | Jurach | |
| 9,208,144 B1 | 12/2015 | Abdulnasyrov | |
| 9,213,694 B2 | 12/2015 | Hieber et al. | |
| 9,396,184 B2 | 7/2016 | Roy | |
| 9,465,797 B2 | 10/2016 | Ji | |
| 9,471,563 B2 | 10/2016 | Trese | |
| 9,519,640 B2 | 12/2016 | Perez | |
| 9,552,355 B2 | 1/2017 | Dymetman | |
| 9,600,473 B2 | 3/2017 | Leydon | |
| 9,613,026 B2 | 4/2017 | Hodson | |
| 2001/0009009 A1 | 7/2001 | Iizuka | |
| 2001/0029455 A1 | 10/2001 | Chin et al. | |
| 2002/0002451 A1 | 1/2002 | Sukehiro | |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1 | 4/2002 | Heilig et al. | |
| 2002/0059566 A1 | 5/2002 | Delcambre et al. | |
| 2002/0078091 A1 | 6/2002 | Vu et al. | |
| 2002/0083029 A1 | 6/2002 | Chun et al. | |
| 2002/0083103 A1 | 6/2002 | Ballance | |
| 2002/0086268 A1 | 7/2002 | Shpiro | |
| 2002/0087313 A1 | 7/2002 | Lee et al. | |
| 2002/0099744 A1 | 7/2002 | Coden et al. | |
| 2002/0107683 A1 | 8/2002 | Eisele | |
| 2002/0111788 A1 | 8/2002 | Kimpara | |
| 2002/0111789 A1 | 8/2002 | Hull | |
| 2002/0111967 A1 | 8/2002 | Nagase | |
| 2002/0115044 A1 | 8/2002 | Shpiro | |
| 2002/0124109 A1 | 9/2002 | Brown | |
| 2002/0143537 A1 | 10/2002 | Ozawa et al. | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0188439 A1 | 12/2002 | Marcu | |
| 2002/0198699 A1 | 12/2002 | Greene et al. | |
| 2002/0198701 A1 | 12/2002 | Moore | |
| 2002/0198713 A1 | 12/2002 | Franz et al. | |
| 2003/0004705 A1* | 1/2003 | Kempe | 704/9 |
| 2003/0009320 A1 | 1/2003 | Furuta | |
| 2003/0009322 A1 | 1/2003 | Marcu | |
| 2003/0014747 A1 | 1/2003 | Spehr | |
| 2003/0023423 A1 | 1/2003 | Yamada et al. | |
| 2003/0040900 A1 | 2/2003 | D'Agostini | |
| 2003/0061022 A1 | 3/2003 | Reinders | |
| 2003/0077559 A1 | 4/2003 | Braunberger et al. | |
| 2003/0129571 A1 | 7/2003 | Kim | |
| 2003/0144832 A1 | 7/2003 | Harris | |
| 2003/0154071 A1 | 8/2003 | Shreve | |
| 2003/0158723 A1 | 8/2003 | Masuichi et al. | |
| 2003/0176995 A1 | 9/2003 | Sukehiro | |
| 2003/0182102 A1 | 9/2003 | Corston-Oliver et al. | |
| 2003/0191626 A1 | 10/2003 | Al-Onaizan et al. | |
| 2003/0192046 A1 | 10/2003 | Spehr | |
| 2003/0200094 A1 | 10/2003 | Gupta | |
| 2003/0204400 A1 | 10/2003 | Marcu et al. | |
| 2003/0216905 A1 | 11/2003 | Chelba et al. | |
| 2003/0217052 A1 | 11/2003 | Rubenczyk et al. | |
| 2003/0233222 A1 | 12/2003 | Soricut et al. | |
| 2004/0006560 A1 | 1/2004 | Chan et al. | |
| 2004/0015342 A1 | 1/2004 | Garst | |
| 2004/0023193 A1 | 2/2004 | Wen et al. | |
| 2004/0024581 A1 | 2/2004 | Koehn et al. | |
| 2004/0030551 A1 | 2/2004 | Marcu et al. | |
| 2004/0034520 A1 | 2/2004 | Langkilde-Geary | |
| 2004/0035055 A1 | 2/2004 | Zhu et al. | |
| 2004/0044517 A1 | 3/2004 | Palmquist | |
| 2004/0044530 A1 | 3/2004 | Moore | |
| 2004/0059708 A1 | 3/2004 | Dean et al. | |
| 2004/0059730 A1 | 3/2004 | Zhou | |
| 2004/0068411 A1 | 4/2004 | Scanlan | |
| 2004/0093327 A1 | 5/2004 | Anderson et al. | |
| 2004/0098247 A1 | 5/2004 | Moore | |
| 2004/0102956 A1 | 5/2004 | Levin | |
| 2004/0102957 A1* | 5/2004 | Levin | G06F 17/2735 704/3 |
| 2004/0111253 A1 | 6/2004 | Luo et al. | |
| 2004/0115597 A1 | 6/2004 | Butt | |
| 2004/0122656 A1 | 6/2004 | Abir | |
| 2004/0167768 A1 | 8/2004 | Travieso et al. | |
| 2004/0167784 A1 | 8/2004 | Travieso et al. | |
| 2004/0176945 A1* | 9/2004 | Inagaki | G06F 17/2715 704/4 |
| 2004/0193401 A1 | 9/2004 | Ringger et al. | |
| 2004/0230418 A1 | 11/2004 | Kitamura | |
| 2004/0237044 A1 | 11/2004 | Travieso et al. | |
| 2004/0255281 A1 | 12/2004 | Imamura et al. | |
| 2004/0260532 A1 | 12/2004 | Richardson et al. | |
| 2005/0021322 A1 | 1/2005 | Richardson et al. | |
| 2005/0021323 A1 | 1/2005 | Li | |
| 2005/0021517 A1 | 1/2005 | Marchisio | |
| 2005/0026131 A1 | 2/2005 | Elzinga et al. | |
| 2005/0033565 A1* | 2/2005 | Koehn | 704/5 |
| 2005/0038643 A1 | 2/2005 | Koehn | |

(56) References Cited

U.S. PATENT DOCUMENTS

| | | |
|---|---|---|
| 2005/0054444 A1 | 3/2005 | Okada |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0107999 A1* | 5/2005 | Kempe et al. ............... 704/9 |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0171944 A1 | 8/2005 | Palmquist |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1* | 1/2006 | Och ............................ 704/2 |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0095526 A1 | 5/2006 | Levergood et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136193 A1* | 6/2006 | Lux-Pogodalla ... G06F 17/2247 704/2 |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1 | 7/2006 | Fellenstein et al. |
| 2006/0190241 A1 | 8/2006 | Goutte et al. |
| 2006/0282255 A1 | 12/2006 | Lu et al. |
| 2007/0010989 A1* | 1/2007 | Faruquie ............ G06F 17/2818 704/2 |
| 2007/0015121 A1 | 1/2007 | Johnson et al. |
| 2007/0016400 A1 | 1/2007 | Soricutt et al. |
| 2007/0016401 A1 | 1/2007 | Ehsani et al. |
| 2007/0016918 A1 | 1/2007 | Alcorn et al. |
| 2007/0020604 A1 | 1/2007 | Chulet |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0060114 A1 | 3/2007 | Ramer et al. |
| 2007/0073532 A1 | 3/2007 | Brockett et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1* | 5/2007 | Galley et al. ................ 434/353 |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1* | 11/2007 | Chen ................. G06F 17/2818 704/2 |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0052061 A1 | 2/2008 | Kim et al. |
| 2008/0065478 A1 | 3/2008 | Kohlmeier et al. |
| 2008/0065974 A1 | 3/2008 | Campbell |
| 2008/0086298 A1 | 4/2008 | Anismovich |
| 2008/0109209 A1 | 5/2008 | Fraser et al. |
| 2008/0109374 A1 | 5/2008 | Levergood et al. |
| 2008/0114583 A1 | 5/2008 | Al-Onaizan et al. |
| 2008/0154577 A1 | 6/2008 | Kim et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0201344 A1 | 8/2008 | Levergood et al. |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0288240 A1 | 11/2008 | D'Agostini |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0094017 A1 | 4/2009 | Chen |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1* | 8/2009 | Wong et al. .................. 704/4 |
| 2009/0217196 A1 | 8/2009 | Neff et al. |
| 2009/0234634 A1 | 9/2009 | Chen et al. |
| 2009/0234635 A1 | 9/2009 | Bhatt et al. |
| 2009/0240539 A1 | 9/2009 | Slawson |
| 2009/0241115 A1 | 9/2009 | Raffo et al. |
| 2009/0248662 A1 | 10/2009 | Murdock |
| 2009/0313005 A1 | 12/2009 | Jaquinta |
| 2009/0313006 A1 | 12/2009 | Tang |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0057439 A1 | 3/2010 | Ideuchi et al. |
| 2010/0057561 A1 | 3/2010 | Gifford |
| 2010/0082326 A1* | 4/2010 | Bangalore ............ G06F 17/289 704/3 |
| 2010/0121630 A1 | 5/2010 | Mende et al. |
| 2010/0138210 A1 | 6/2010 | Seo et al. |
| 2010/0138213 A1 | 6/2010 | Bicici et al. |
| 2010/0158238 A1 | 6/2010 | Saushkin |
| 2010/0174524 A1 | 7/2010 | Koehn |
| 2010/0179803 A1 | 7/2010 | Sawaf |
| 2010/0204978 A1* | 8/2010 | Gao .................... G06F 17/2827 704/2 |
| 2011/0029300 A1 | 2/2011 | Marcu et al. |
| 2011/0066469 A1 | 3/2011 | Kadosh |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0097693 A1 | 4/2011 | Crawford |
| 2011/0184722 A1 | 7/2011 | Sneddon et al. |
| 2011/0191096 A1 | 8/2011 | Sarikaya et al. |
| 2011/0191410 A1 | 8/2011 | Refuah et al. |
| 2011/0225104 A1 | 9/2011 | Soricut et al. |
| 2011/0289405 A1 | 11/2011 | Fritsch et al. |
| 2011/0307241 A1* | 12/2011 | Waibel ................. G10L 15/265 704/2 |
| 2012/0016657 A1* | 1/2012 | He et al. ........................ 704/2 |
| 2012/0022852 A1 | 1/2012 | Tregaskis |
| 2012/0096019 A1 | 4/2012 | Manickam et al. |
| 2012/0116751 A1 | 5/2012 | Bernardini et al. |
| 2012/0136646 A1* | 5/2012 | Kraenzel et al. .............. 704/2 |
| 2012/0150441 A1 | 6/2012 | Ma et al. |
| 2012/0150529 A1 | 6/2012 | Kim et al. |
| 2012/0191457 A1* | 7/2012 | Minnis et al. ................ 704/260 |
| 2012/0203776 A1* | 8/2012 | Nissan ............ G06F 17/30746 707/728 |
| 2012/0232885 A1* | 9/2012 | Barbosa ............ G06F 17/2715 704/9 |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |

(56) References Cited

U.S. PATENT DOCUMENTS

| | | |
|---|---|---|
| 2012/0330990 A1 | 12/2012 | Chen et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0124185 A1 | 5/2013 | Sarr et al. |
| 2013/0144594 A1 | 6/2013 | Bangalore et al. |
| 2013/0173247 A1 | 7/2013 | Hodson |
| 2013/0238310 A1 | 9/2013 | Viswanathan |
| 2013/0290339 A1 | 10/2013 | LuVogt et al. |
| 2013/0325442 A1 | 12/2013 | Dahlmeier |
| 2014/0006003 A1 | 1/2014 | Soricut et al. |
| 2014/0019114 A1 | 1/2014 | Travieso et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0149102 A1 | 5/2014 | Marcu et al. |
| 2014/0229257 A1 | 8/2014 | Reistad et al. |
| 2014/0297252 A1 | 10/2014 | Prasad et al. |
| 2014/0350931 A1 | 11/2014 | Levit et al. |
| 2014/0358519 A1 | 12/2014 | Mirkin |
| 2014/0358524 A1 | 12/2014 | Papula |
| 2014/0365201 A1 | 12/2014 | Gao |
| 2015/0051896 A1 | 2/2015 | Simard et al. |
| 2015/0106076 A1 | 4/2015 | Hieber et al. |
| 2015/0186362 A1 | 7/2015 | Li |

FOREIGN PATENT DOCUMENTS

| | | |
|---|---|---|
| AU | 5202299 A | 10/1999 |
| CA | 2221506 A1 | 12/1996 |
| CA | 2408819 | 11/2006 |
| CA | 2475857 | 12/2008 |
| CA | 2480398 | 6/2011 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| DE | 1488338 | 4/2010 |
| DE | 202005022113.9 | 2/2014 |
| EP | 0469884 | 2/1992 |
| EP | 0715265 | 6/1996 |
| EP | 0830774 A2 | 3/1998 |
| EP | 0933712 A2 | 8/1999 |
| EP | 0933712 A3 | 1/2001 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235172 A2 | 8/2002 |
| EP | 0734556 B1 | 9/2002 |
| EP | 1488338 | 9/2004 |
| EP | 0830774 B1 | 10/2004 |
| EP | 1489523 A2 | 12/2004 |
| EP | 1488338 | 4/2010 |
| EP | 2299369 A1 | 3/2011 |
| ES | 1488338 | 4/2010 |
| FR | 1488338 | 4/2010 |
| GB | 2241359 A | 8/1991 |
| GB | 1488338 | 4/2010 |
| HK | 1072987 | 2/2006 |
| HK | 1072987 | 9/2010 |
| JP | 07244666 | 9/1995 |
| JP | H08101837 A | 4/1996 |
| JP | 10011447 | 1/1998 |
| JP | H10509543 A | 9/1998 |
| JP | H11507752 A | 7/1999 |
| JP | 11272672 | 10/1999 |
| JP | 3190881 B2 | 7/2001 |
| JP | 3190882 B2 | 7/2001 |
| JP | 3260693 B2 | 2/2002 |
| JP | 3367675 B2 | 1/2003 |
| JP | 2003157402 A | 5/2003 |
| JP | 2004501429 | 1/2004 |
| JP | 2004062726 | 2/2004 |
| JP | 3762882 B2 | 4/2006 |
| JP | 2006216073 A | 8/2006 |
| JP | 2007042127 A | 2/2007 |
| JP | 2008101837 | 5/2008 |
| JP | 4485548 B2 | 6/2010 |
| JP | 4669373 B2 | 4/2011 |
| JP | 4669430 B2 | 4/2011 |
| JP | 5452868 | 1/2014 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO03083709 | 10/2003 |
| WO | WO2003083710 | 10/2003 |
| WO | WO2004042615 | 5/2004 |
| WO | WO2007056563 | 5/2007 |
| WO | WO2007068123 A1 | 6/2007 |
| WO | WO2010062540 A1 | 6/2010 |
| WO | WO2010062542 A1 | 6/2010 |
| WO | WO2011041675 | 4/2011 |
| WO | WO2011162947 | 12/2011 |

OTHER PUBLICATIONS

Minimum Bayes-Risk Techniques in Automatic Speech Recognition and Statistical Machine Translation by Shankar Kumar: A dissertation submitted to the Johns Hopkins University in conformity with the requirements for the degree of Doctor of Philosophy. Baltimore, Maryland, Oct. 2004.*

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action dated Jun. 7, 2004 in Canadian Patent Application 2408819, filed May 11, 2001.

First Office Action dated Jun. 14, 2007 in Canadian Patent Application 2475857, filed Mar. 11, 2003.

Office Action dated Mar. 26, 2012 in German Patent Application 10392450.7, filed Mar. 28, 2003.

First Office Action dated Nov. 5, 2008 in Canadian Patent Application 2408398, filed Mar. 27, 2003.

Second Office Action dated Sep. 25, 2009 in Canadian Patent Application 2408398, filed Mar. 27, 2003.

First Office Action dated Mar. 1, 2005 in European Patent Application No. 03716920.8, filed Mar. 27, 2003.

Second Office Action dated Nov. 9, 2006 in European Patent Application No. 03716920.8, filed Mar. 27, 2003.

Third Office Action dated Apr. 30, 2008 in European Patent Application No. 03716920.8, filed Mar. 27, 2003.

Office Action dated Oct. 25, 2011 in Japanese Patent Application 2007-536911 filed Oct. 12, 2005.

(56) References Cited

OTHER PUBLICATIONS

Office Action dated Jul. 24, 2012 in Japanese Patent Application 2007-536911 filed Oct. 12, 2005.
Final Office Action dated Apr. 9, 2013 in Japanese Patent Application 2007-536911 filed Oct. 12, 2005.
Office Action dated May 13, 2005 in Chinese Patent Application 1812317.1, filed May 11, 2001.
Office Action dated Apr. 21, 2006 in Chinese Patent Application 1812317.1, filed May 11, 2001.
Office Action dated Jul. 19, 2006 in Japanese Patent Application 2003-577155, filed Mar. 11, 2003.
Office Action dated Mar. 1, 2007 in Chinese Patent Application 3805749.2, filed Mar. 11, 2003.
Office Action dated Feb. 27, 2007 in Japanese Patent Application 2002-590018, filed May 13, 2002.
Office Action dated Jan. 26, 2007 in Chinese Patent Application 3807018.9, filed Mar. 27, 2003.
Office Action dated Dec. 7, 2005 in Indian Patent Application 2283/DELNP/2004, filed Mar. 11, 2003.
Office Action dated Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15 2002, School of Information Science, JAIST, Nomi, Ishikaw, Japan.
Office Action dated Aug. 29, 2006 in Japanese Patent Application 2003-581064, filed Mar. 27, 2003.
Office Action dated Jan. 26, 2007 in Chinese Patent Application 3807027.8, filed Mar. 28, 2003.
Office Action dated Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
"Elhadad, Michael, ""FUF: the Universal Unifier User Manual Version 5.2""", 1993, Department of Computer Science,Ben Gurion University, Beer Sheva, Israel."
"Elhadad, Michael, ""Using Argumentation to Control Lexical Choice: A Functional Unification Implementation""",1992, Ph.D. Thesis, Graduate School of Arts and Sciences, Columbia University."
"Elhadad, M. and Robin, J., ""SURGE: a Comprehensive Plug-in Syntactic Realization Component for TextGeneration""", 1999 (available at http://www.cs.bgu.ac.il/-elhadad/pub.html),".
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps> 'retrieved on May 6, 2004! abstract.

Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
"Fung, P. and Yee, L., ""An IR Approach for Translating New Words from Nonparallel, Comparable Texts""", 1998,36th Annual Meeting of the ACL, 17th International Conference on Computational Linguistics, pp. 414-420."
"Fung, Pascale, ""Compiling Bilingual Lexicon Entries From a Non-Parallel English-Chinese Corpus""", 1995, Proc, ofthe Third Workshop on Very Large Corpora, Boston, MA, pp. 173-183."
"Gale, W. and Church, K., ""A Program for Aligning Sentences in Bilingual Corpora,""" 1991, 29th Annual Meeting ofthe ACL, pp. 177-183."
Gale, W. and Church, K., "A Program for Aligning Sentences in Bilingual Corpora," 1993, Computational Linguisitcs, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL 2004, July.
"Germann et al., ""Fast Decoding and Optimal Decoding for Machine Translation""", 2001, Proc. of the 39th AnnualMeeting of the ACL, Toulouse, France, pp. 228-235."
"Germann, Ulrich: ""Building a Statistical Machine Translation System from Scratch: How Much Bang for theBuck Can We Expect?"" Proc. of the Data-Driven MT Workshop of ACL-01, Toulouse, France, 2001."
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
"Grefenstette, Gregory, ""The World Wide Web as a Resource for Example-Based Machine TranslationTasks""", 1999, Translating and the Computer 21, Proc. of the 21 st International Cant. on Translating and theComputerLondon, UK, 12 pp."
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
"Hatzivassiloglou, V. et al., ""Unification-Based Glossing""", 1995, Proc. of the International Joint Conference onArtificial Intelligence, pp. 1382-1389."
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.

(56) References Cited

OTHER PUBLICATIONS

"Jelinek, F., ""Fast Sequential Decoding Algorithm Using a Stack"", Nov. 1969, IBM J. Res. Develop., vol. 13, No. 6, pp. 675-685."

"Jones, K. Sparck, ""Experiments in Relevance Weighting of Search Terms"", 1979, Information Processing &Management, vol. 15, Pergamon Press Ltd., UK, pp. 133-144."

Klein et al., "Accurate Unlexicalized Parsing," Jul. 2003, in Proc. of the 41st Annual Meeting of the ACL, pp. 423-430.

"Knight et al., ""Integrating Knowledge Bases and Statistics in MT,"" 1994, Proc. of the Conference of the Associationfor Machine Translation in the Americas."

"Knight et al., ""Filling Knowledge Gaps in a Broad-Coverage Machine Translation System"", 1995, Proc. ofthe14th International Joint Conference on Artificial Intelligence, Montreal, Canada, vol. 2, pp. 1390-1396."

"Knight, K. and Al-Onaizan, Y., ""A Primer on Finite-State Software for Natural Language Processing"", 1999 (available at http://www.isI.edullicensed-sw/carmel)."

Knight, K. and Al-Onaizan, Y., "Translation with Finite-State Devices," Proceedings of the 4th AMTA Conference, 1998.

"Knight, K. and Chander, I., ""Automated Postediting of Documents,"" 1994, Proc. of the 12th Conference on ArtificialIntelligence, pp. 779-784. "

Knight, K. and Graehl, J., "Machine Transliteration", 1997, Proc. of the ACL-97, Madrid, Spain, pp. 128-135.

"Knight, K. and Hatzivassiloglou, V., ""Two-Level, Many-Paths Generation,"" 1995, Proc. of the 33rd AnnualConference of the ACL, pp. 252-260."

"Knight, K. and Luk, S., ""Building a Large-Scale Knowledge Base for Machine Translation,"" 1994, Proc. of the 12thConference on Artificial Intelligence, pp. 773-778."

"Knight, K. and Marcu, D., ""Statistics-Based Summarization—Step One: Sentence Compression,"" 2000, AmericanAssociation for Artificial Intelligence Conference, pp. 703-710."

"Knight, K. and Yamada, K., ""A Computational Approach to Deciphering Unknown Scripts,"" 1999, Proc. of the ACLWorkshop on Unsupervised Learning in Natural Language Processing."

"Knight, Kevin, ""A Statistical MT Tutorial Workbook,"" 1999, JHU Summer Workshop (available at http://www.isI.edu/natural-language/mUwkbk.rtf)."

Knight, Kevin, "Automating Knowledge Acquisition for Machine Translation," 1997, AI Magazine, vol. 18, No. 4.

"Knight, Kevin, ""Connectionist Ideas and Algorithms,"" Nov. 1990, Communications of the ACM, vol. 33, No. 11, pp. 59-74."

"Knight, Kevin, ""Decoding Complexity in Word-Replacement Translation Models"", 1999, Computational Linguistics, vol. 25, No. 4."

"Knight, Kevin, ""Integrating Knowledge Acquisition and Language Acquisition"", May 1992, Journal of AppliedIntelligence, vol. 1, No. 4."

"Knight, Kevin, ""Learning Word Meanings by Instruction,"" 1996, Proc. of the D National Conference on ArtificialIntelligence, vol. 1, pp. 447-454."

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

"Koehn, P. and Knight, K., ""ChunkMT: Statistical Machine Translation with Richer Linguistic Knowledge,"" Apr. 2002,Information Sciences Institution."

"Koehn, P. and Knight, K., ""Estimating Word Translation Probabilities from Unrelated Monolingual Corpora Usingthe EM Algorithm,"" 2000, Proc. of the 17th meeting of the AAAI."

"Abney, Steven P. , ""Parsing by Chunks,"" 1991, Principle-Based Parsing: Computation and Psycholinguistics, vol. 44,pp. 257-279."

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

"Al-Onaizan et al., ""Translating with Scarce Resources,"" 2000, 17th National Conference of the American Associationfor Artificial Intelligence, Austin, TX, pp. 672-678."

Al-Onaizan, Y. and Knight K., "Machine Transliteration of Names in Arabic Text," Proceedings of ACL Workshop on Computational Approaches to Semitic Languages. Philadelphia, 2002.

"Al-Onaizan, Y. and Knight, K., ""Named Entity Translation: Extended Abstract"", 2002, Proceedings of HLT-02, SanDiego, CA."

"Al-Onaizan, Y. and Knight, K., ""Translating Named Entities Using Monolingual and Bilingual Resources,"" 2002, Proc. of the 40th Annual Meeting of the ACL, pp. 400-408."

"Alshawi et al., ""Learning Dependency Translation Models as Collections of Finite-State Head Transducers,"" 2000, Computational Linguistics, vol. 26, pp. 45-60."

Alshawi, Hiyan, "Head Automata for Speech Translation", Proceedings of the ICSLP 96, 1996, Philadelphia, Pennslyvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

"Arbabi et al., ""Algorithms for Arabic name transliteration,"" Mar. 1994, IBM Journal of Research and Development,vol. 38, Issue 2, pp. 183-194."

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

"Bangalore, S. and Rambow, O., ""Evaluation Metrics for Generation,"" 2000, Proc. of the 1st International NaturalLanguage Generation Conf., vol. 14, pp. 1-8."

"Bangalore, S. and Rambow, O.,""Using TAGs, a Tree Model, and a Language Model for Generation,"" May 2000,Workshop TAG+5, Paris."

"Bangalore S. and Rambow, O., ""Corpus-Based Lexical Choice in Natural Language Generation,"" 2000, Proc. ofthe 38th Annual ACL, Hong Kong, pp. 464-471."

"Bangalore, S. and Rambow, O., ""Exploiting a Probabilistic Hierarchical Model for Generation,"" 2000, Proc. of 18thconf. on Computational Linguistics, vol. 1, pp. 42-48."

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.

"Barnett et al., ""Knowledge and Natural Language Processing,"" Aug. 1990, Communications of the ACM, vol. 33,Issue 8, pp. 50-71."

"Baum, Leonard, ""An Inequality and Associated Maximization Technique in Statistical Estimation for ProbabilisticFunctions of Markov Processes"", 1972, Inequalities 3:1-8."

Berhe, G. et al., "Modeling Service-based Multimedia Content Adaptation in Pervasive Computing," CF '04 (Ischia, Italy) Apr. 14-16, 2004, pp. 60-69.

Boiotet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

"Brants, Thorsten, ""TnT—A Statistical Part-of-Speech Tagger,"" 2000, Proc. of the 6th Applied Natural LanguageProcessing Conference, Seattle."

Brill, Eric, "Transformation-Based Error-Driven Learning and Natural Language Processing: A Case Study in Part of Speech Tagging", 1995, Assocation for Computational Linguistics, vol. 21, No. 4, pp. 1-37.

(56) References Cited

OTHER PUBLICATIONS

"Brill, Eric. ""Transformation-Based Error-Driven Learning and Natural Language Processing: A Case Study in Partof Speech Tagging""",1995, Computational Linguistics, vol. 21, No. 4, pp. 543-565."
"Brown et al., ""A Statistical Approach to Machine Translation,"" Jun. 1990, Computational Linguistics, vol. 16, No. 2, pp. 79-85."
Brown et al., "Word-Sense Disambiguation Using Statistical Methods," 1991, Proc. of 29th Annual ACL, pp. 264-270.
"Brown et al., ""The Mathematics of Statistical Machine Translation: Parameter Estimation,"" 1993, ComputationalLinguistics, vol. 19, Issue 2, pp. 263-311."
"Brown, Ralf, ""Automated Dictionary Extraction for ""Knowledge-Free"" Example-Based Translation,"" 1997, Proc. of 7th Int'l Cont. on Theoretical and Methodological Issues in MT, Santa Fe, NM, pp. 111-118."
"Callan et al., ""TREC and TIPSTER Experiments with Inquery,"" 1994, Information Processing and Management,vol. 31, Issue 3, pp. 327-343."
Callison-Burch, C. et al., "Statistical Machine Translation with Word- and Sentence-aligned Parallel Corpora," In Proceedings of the 42nd Meeting on Assoc. For Computational Linguistics (Barcelona, Spain, Jul. 21-26, 2004). Meeting of the Acl. Assoc. For Computational Linguistics, Morristown, Nj, 1. (NPL0034) Annual.
"Carl, Michael. ""A Constructivist Approach to Machine Translation,"" 1998, New Methods of Language Processingand Computational Natural Language Learning, pp. 247-256."
"Chen, K. and Chen, H., ""Machine Translation: an Integrated Approach,"" 1995, Proc. of 6th Int'l Cont. on Theoreticaland Methodological Issue in MT, pp. 287-294."
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
"Clarkson, P. and Rosenfeld, R., ""Statistical Language Modeling Using the CMU-Cambridge Toolkit""", 1997, Proc. ESCA Eurospeech, Rhodes, Greece, pp. 2707-2710."
Cohen et al., "Spectral Bloom Filters," SIGMOD 2003, Jun. 9-12, 2003, ACM pp. 241-252.
Cohen, "Hardware-Assisted Algorithm for Full-text Large-Dictionary String Matching Using n-gram Hashing," 1998, Information Processing and Management, vol. 34, No. 4, pp. 443-464.
Cohen, Yossi, "Interpreter for FUF," (available at ftp:/lftp.cs.bgu.ac.il/ pUb/people/elhadad/fuf-life.lf) (downloaded Jun. 1, 2008).
Corston-Oliver, Simon, ""Beyond String Matching and Cue Phrases: Improving Efficiency and Coverage inDiscourse Analysis""", 1998, The AAAI Spring Symposium on Intelligent Text Summarization, pp. 9-15.
Covington, "An Algorithm to Align Words for Historical Comparison", Computational Linguistics, 1996,vol. 22, No. 4, pp. 481-496.
"Dagan, I. and Itai, A., ""Word Sense Disambiguation Using a Second Language Monolingual Corpus""", 1994, Association forComputational Linguistics, vol. 20, No. 4, pp. 563-596."
"Dempster et al., ""Maximum Likelihood from Incomplete Data via the EM Algorithm""", 1977, Journal of the RoyalStatistical Society, vol. 39, No. 1, pp. 1-38."
"Diab, M. and Finch, S., ""A Statistical Word-Level Translation Model for Comparable Corpora,"" 2000, In Proc.of theConference on Content Based Multimedia Information Access (RIAO)."
"Diab, Mona, ""An Unsupervised Method for Multilingual Word Sense Tagging Using Parallel Corpora: APreliminary Investigation""", 2000, SIGLEX Workshop on Word Senses and Multi-Linguality, pp. 1-9."

Eisner, Jason, "Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, vol. 23 No. 2, pp. 195-239.
"Elhadad, M. and Robin, J., ""An Overview of SURGE: a Reusable Comprehensive Syntactic RealizationComponent,"" 1996, Technical Report 96-03, Department of Mathematics and Computer Science, Ben GurionUniversity, Beer Sheva, Israel."
Elhadad, M. and Robin, J., "Controlling Content Realization with Functional Unification Grammars", 1992, Aspects of Automated Natural Language Generation, Dale et al. (eds)., Springer Verlag, pp. 89-104.
Final Office Action, dated Nov. 19, 2013, U.S. Appl. No. 11/454,212, filed Jun. 15, 2006.
Advisory Action, dated Aug. 5, 2013, U.S. Appl. No. 11/272,460, filed Nov. 9, 2005.
Non-Final Office Action, dated Feb. 3, 2014, U.S. Appl. No. 11/272,460, filed Nov. 9, 2005.
Final Office Action, dated May 21, 2014, U.S. Appl. No. 11/272,460, filed Nov. 9, 2005.
PTAB Decision, May 5, 2011, U.S. Appl. No. 11/087,376, filed Mar. 22, 2005.
Notice of Allowance, dated Oct. 2, 2013, U.S. Appl. No. 11/107,304, filed Apr. 15, 2005.
Notice of Allowance, dated Sep. 10, 2014, U.S. Appl. No. 11/635,248, Dec. 5, 2006.
Non-Final Office Action, dated Jul. 15, 2014, U.S. Appl. No. 11/635,248, filed Dec. 5, 2006.
Supplemental Notice of Allowability, dated Aug. 28, 2014, U.S. Appl. No. 11/501,189, filed Aug. 7, 2006.
Notice of Allowance, dated Jun. 26, 2014, U.S. Appl. No. 11/501,189, filed Aug. 7, 2006.
Non-Final Office Action, dated Dec. 3, 2013, U.S. Appl. No. 11/501,189, filed Aug. 7, 2006.
Final Office Action, dated Jul. 14, 2014, U.S. Appl. No. 11/640,157, filed Dec. 15, 2006.
Non-Final Office Action, dated Jan. 28, 2014, U.S. Appl. No. 11/640,157, filed Dec. 15, 2006.
Non-Final Office Action, dated Jan. 29, 2015, U.S. Appl. No. 11/640,157, filed Dec. 15, 2006.
Final Office Action, dated Jan. 27, 2014, U.S. Appl. No. 11/784,161, filed Apr. 4, 2007.
Notice of Allowance, dated May 5, 2014, U.S. Appl. No. 11/784,161, filed Apr. 4, 2007.
Supplemental Notice of Allowance, dated Jul. 30, 2014, U.S. Appl. No. 11/784,161, filed Apr. 4, 2007.
Non-Final Office Action, dated Mar. 29, 2013, U.S. Appl. No. 12/077,005, filed Mar. 14, 2008.
Notice of Allowance, dated Apr. 30, 2014, U.S. Appl. No. 11/811,228, filed Jun. 8, 2007.
Non-Final Office Action, dated Nov. 20, 2013, U.S. Appl. No. 11/811,228, filed Jun. 8, 2007.
Advisory Action, dated Sep. 27, 2013, U.S. Appl. No. 11/811,228, filed Jun. 8, 2007.
Notice of Allowance, dated Oct. 9, 2014, U.S. Appl. No. 12/132,401, filed Jun. 3, 2008.
Non-Final Office Action, dated Jun. 12, 2014, U.S. Appl. No. 12/218,859, filed Jul. 17, 2008.
Advisory Action dated Jun. 20, 2013, U.S. Appl. No. 12/510,913, filed Jul. 28, 2009.
Office Action, dated Jun. 9, 2014, U.S. Appl. No. 12/510,913, filed Jul. 28, 2009.
Notice of Allowance, dated Oct. 7, 2014, U.S. Appl. No. 12/510,913, filed Jul. 28, 2009.
Supplemental Notice of Allowability, dated Jan. 26, 2015, U.S. Appl. No. 12/510,913, filed Jul. 28, 2009.
Supplemental Notice of Allowability, dated Feb. 2, 2015, U.S. Appl. No. 12/510,913, filed Jul. 28, 2009.
Final Office Action, dated Feb. 12, 2014, U.S. Appl. No. 12/720,536, filed Mar. 9, 2010.
Advisory Action, dated Apr. 23, 2014, U.S. Appl. No. 12/720,536, filed Mar. 9, 2010.

(56) References Cited

OTHER PUBLICATIONS

Non-Final Office Action, dated Jun. 23, 2014, U.S. Appl. No. 12/720,536, filed Mar. 9, 2010.
Notice of Allowance, dated Aug. 18, 2014, U.S. Appl. No. 13/417,071, filed Mar. 9, 2012.
Office Action, dated Mar. 21, 2014, U.S. Appl. No. 13/417,071, filed Mar. 9, 2012.
Non-Final Office Action, dated Aug. 21, 2014, U.S. Appl. No. 13/089,202, filed Apr. 18, 2011.
Final Office Action, dated Jan. 21, 2015, U.S. Appl. No. 13/089,202, filed Apr. 18, 2011.
Notice of Allowance, dated Nov. 14, 2013, U.S. Appl. No. 13/161,401, filed Jun. 15, 2011.
Notice of Allowance, dated Mar. 19, 2014, U.S. Appl. No. 13/277,149, filed Oct. 19, 2011.
Notice of Allowance, dated Jun. 13, 2014, U.S. Appl. No. 13/539,037, filed Jun. 29, 2012.
Non-Final Office Action, dated Feb. 26, 2016, U.S. Appl. No. 12/720,536, filed Mar. 9, 2010.
Final Office Action, dated Apr. 19, 2016, U.S. Appl. No. 13/089,202, filed Apr. 18, 2011.
Non-Final Office Action, dated Jun. 1, 2016, U.S. Appl. No. 11/272,460, filed Nov. 9, 2005.
Advisory Action, dated Jul. 8, 2016, U.S. Appl. No. 13/089,202, filed Apr. 18, 2011.
Final Office Action, dated Oct. 4, 2016, U.S. Appl. No. 12/720,536, filed Mar. 9, 2010.
Non-Final Office Action, dated Dec. 15, 2016, U.S. Appl. No. 11/272,460, filed Nov. 9, 2005.
Non-Final Office Action, dated Jan. 27, 2017, U.S. Appl. No. 11/454,212, filed Jun. 15, 2006.
Non-Final Office Action, dated Mar. 21, 2017, U.S. Appl. No. 13/089,202, filed Apr. 18, 2011.
Gao et al., Proceedings of the Joint Fifth Workshop on Statistical Machine Translation and Metrics (MATR), 2010, pp. 1-10 and 121-126.
Przybocki et al., "GALE Machine Translation Metrology: Definition, Implementation, and Calculation," Chapter 5.4 in Handbook of Natural Language Processing and Machine Translation, Olive et al., eds., Springer, 2011, pp. 783-811.
Cormode et al., "The String Edit Distance Matching Problem with Moves," in ACM Transactions on Algorithms (TALG), 3(1):1-19, 2007.
Lavie et al., "The Meteor Metric for Automatic Evaluation of Machine Translation," Machine Translation, Sep. 2009, 23: 105-115.
Dreyer, Markus et al., "HyTER: Meaning-Equivalent Semantics for Translation Evaluation," in Proceedings of the 2012 Conference of the North American Chapter of the Association of Computational Linguistics: Human Language Technologies. Jun. 3, 2012. 10 pahes.
Przybocki, M.; Peterson, K.; Bronsart, S.; Official results of the NIST 2008 "Metrics for MAchine TRanslation" Challenge (MetricsMATR08), 7 pages. http://nist.gov/speech/tests/metricsmatr/2008/results/; https://www.nist.gov/multimodal-information-group/metrics-machine-translation-evaluation#history; https://www.nist.gov/itl/iad/mig/metrics-machine-translation-2010-evaluation.
Hildebrand et al., "Adaptation of the Translation Model for Statistical Machine Translation based on Information Retrieval," EAMT 2005 Conference Proceedings (May 2005), pp. 133-142 (10 pages).
Och et al., "The Alignment Template Approach to Statitstical Machine Translation," Journal Computational Linguistics, vol. 30, Issue 4, Dec. 2004, pp. 417-449 (39 pages).
Sethy et al, "Buidling Topic Specific Language Models from Webdata Using Competitive Models," INTERSPEECH 2005—Eurospeech, 9th European Conference on Speech Communication and Technology, Lisbon, Portugal, Sep. 4-8, 2005, 4 pages.
Potet et al., "Preliminary Experiments on Using Users; Post-Editions to Enhance a SMT System," Proceedings of the15th Conference of the European Association for Machine Translation, May 2011, pp. 161-168.
Ortiz-Martinez et al., "An Interactive Machine Translation System with Online Learning," Proceedings of the ACL-HLT 2011 System Demonstrations, Jun. 21, 2011, pp. 68-73.
Lopez-Salcedo et al., "Online Learning of Log-Linear Weights in Interactive Machine Translation," Communications in Computer and Information Science, vol. 328, 2012. 10 pages.
Blanchon et al., "A Web Service Enabling Gradable Post-edition of Pre-translations Produced by Existing Translation Tools: Practical Use to Provide High Quality Translation of an Online Encyclopedia," Jan. 2009. 8 pages.
Levenberg et al., "Stream-based Translation Models for Statistical Machine Translation," Human Language Technologies: The 2010 Annual Conference of the North American Chapter of the ACL, Jun. 2010, pp. 394-402.
Lagarda et al., "Statistical Post-Editing of a Rule-Based Machine Translation System," Proceedings of NAACL HLT 2009, Jun. 2009, pp. 217-220.
Ehara, "Rule Based Machine Translation Combined with Statistical Post Editor for Japanese to English Patent Translation," MT Summit XI, 2007, pp. 13-18.
Bechara et al., "Statistical Post-Editing for a Statistical MT System," Proceedings of the 13th Machine Translation Summit, 2011, pp. 308-315.
Dobrinkat, "Domain Adaptation in Statistical Machine Translation Systems via User Feedback," Abstract of Master's Thesis, Helsinki University of Technology, Nov. 25, 2008, 103 pages.
Business Wire, "Language Weaver Introduces User-Managed Customization Tool," Oct. 25, 2005, 3 pages. http://www.businesswire.com/news/home/20051025005443/en/Language-Weaver-Introduces-User-Managed-Customization-Tool-Newest.
Winiwarter, "Learning Transfer Rules for Machine Translation from Parallel Corpora," Journal of Digital Information Management, vol. 6, No. 4, Aug. 1, 2008, pp. 285-293 (9 pages).
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 11-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

(56) References Cited

OTHER PUBLICATIONS

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.

Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 page.

"Data Security and Confidentiality," Lilt website [online], 2017 [retrieved on Oct. 19, 2017], Retrieved from the Internet:<https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the Internet:<https://lilt.com/kb/api/memories>, 1 page.

"Quoting—Knowledge Base," Lilt website [online], Jun. 7, 2017 [retrieved on Oct. 19, 2017], Retrieved from the Internet:<https://lilt.com/kb/project-managers/quoting>, 4 pages.

"The Editor—Knowledge Base," Lilt website [online], Aug. 15, 2017 [retrieved on Oct. 19, 2017], Retrieved from the Internet:<https://lilt.com/kb/translators/editor>, 5 pages.

"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.

"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.

"Getting Started—Knowledge Base," Lilt website [online], Apr. 11, 2017 [retrieved on Oct. 20, 2017], Retrieved from the Internet:<https://lilt.com/kb/translators/getting-started>, 2 pages.

"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.

"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.

"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.

"Lilt API_API Reference," Lilt website [online], retrieved on Oct. 20, 2017, Retrieved from the Internet:<https://lilt.com/docs/api>, 53 pages.

"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.

"Projects—Knowledge Base,"Lilt website [online], Jun. 7, 2017, retrieved on Oct. 20, 2017, Retrieved from the Internet: <https://lilt.com/kb/project-managers/projects>, 3 pages.

"Getting Started with lilt," Lilt website [online], May 30, 2017, retrieved on Oct. 20, 2017, Retrieved from the Internet: <https://lilt.com/kb/api/lilt-js>, 6 pages.

"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.

Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.

Notice of Allowance dated Dec. 10, 2013 in Japanese Patent Application 2007-536911, filed Oct. 12, 2005.

Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.

Specia et al. "Improving the Confidence of Machine Translation Quality Estimates," MT Summit XII, Ottawa, Canada, 2009, 8 pages.

Soricut et al., "TrustRank: Inducing Trust in Automatic Translations via Ranking", published in Proceedings of the 48th Annual Meeting of the Association for Computational Linguistics (Jul. 2010), pp. 612-621.

U.S. Appl. No. 11/454,212, filed Jun. 15, 2006.

Editorial FreeLancer Association, Guidelines for Fees, https://web.archive.org/web/20090604130631/http://www.theefa.org/res/code_2.php, Jun. 4, 2009, retrieved Aug. 9, 2014.

Wasnak, L., "Beyond the Basics: How Much Should I Charge", https://web.archive.org/web/20070121231531/http://www.writersmarket.com/assets/pdf/How_Much_Should_I_Charge.pdf, Jan. 21, 2007, retrieved Aug. 19, 2014.

Summons to Attend Oral Proceedings mailed Sep. 18, 2014 in German Patent Application 10392450.7, filed Mar. 28, 2003.

Examination Report dated Jul. 22, 2013 in German Patent Application 112005002534.9, filed Oct. 12, 2005.

Office Action dated Feb. 2, 2015 in German Patent Application 10392450.7, filed Mar. 28, 2003.

Abney, Steven P. , "Parsing by Chunks," 1994, Bell Communications Research, pp. 1-18.

(56) References Cited

OTHER PUBLICATIONS

Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Non-Final, dated May 9, 2013, U.S. Appl. No. 11/454,212, filed Jun. 15, 2006.
Advisory, dated Sep. 30, 2010, U.S. Appl. No. 11/454,212, filed Jun. 15, 2006.
Final, dated May 7, 2013, U.S. Appl. No. 11/272,460, filed Nov. 9, 2005.
Allowance, dated May 15, 2013, U.S. Appl. No. 10/884,175, filed Jul. 2, 2004.
Allowance, dated Aug. 5, 2013, U.S. Appl. No. 11/250,151, filed Oct. 12, 2005.
Non-Final, dated Apr. 1, 2010, U.S. Appl. No. 11/592,450, filed Nov. 2, 2006.
Non-Final, dated Sep. 11, 2013, U.S. Appl. No. 11/635,248, filed Dec. 5, 2006.
Non-final, dated Jul. 17, 2013, U.S. Appl. No. 11/640,157, filed Dec. 15, 2006.
Non-Final, dated Jan. 21, 2010, U.S. Appl. No. 11/640,157, filed Dec. 15, 2006.
Non-Final, dated Dec. 24, 2008, U.S. Appl. No. 11/698,501, filed Jan. 26, 2007.
Non-Final, dated Jun. 4, 2013, U.S. Appl. No. 11/784,161, filed Apr. 4, 2007.
Non-Final, dated Mar. 29, 2013, U.S. Appl. No. 12/077,005, filed Mar. 14, 2008.
Final, dated Jul. 16, 2013, U.S. Appl. No. 11/811,228, filed Jun. 8, 2007.
Non-Final, dated Jul. 7, 2010, U.S. Appl. No. 11/811,228, filed Jun. 8, 2007.
Non-Final, dated Aug. 5, 2011, U.S. Appl. No. 12/218,859, filed Jul. 17, 2008.
Final, dated Apr. 12, 2011, U.S. Appl. No. 12/218,859, filed Jul. 17, 2008.
Non-Final, dated Oct. 4, 2010, U.S. Appl. No. 12/218,859, filed Jul. 17, 2008.
Non Final, dated Aug. 22, 2012, U.S. Appl. No. 12/510,913, filed Jul. 28, 2009.
Final, dated Apr. 11, 2013, U.S. Appl. No. 12/510,913, filed Jul. 28, 2009.
Allowance, dated Oct. 9, 2012, U.S. Appl. No. 12/572,021, filed Oct. 1, 2009.
Non-Final, dated Jun. 19, 2012, U.S. Appl. No. 12/572,021, filed Oct. 1, 2009.
Allowance, dated Mar. 13, 2012, U.S. Appl. No. 12/576,110, filed Oct. 8, 2009.
Non-Final, dated Jul. 7, 2011, U.S. Appl. No. 12/576,110, filed Oct. 8, 2009.
Non-Final, dated Sep. 24, 2013, U.S. Appl. No. 12/720,536, filed Mar. 9, 2010.
Non-Final, dated Jun. 27, 2012, U.S. Appl. No. 12/720,536, filed Mar. 9, 2010.
Advisory, dated Jun. 12, 2013, U.S. Appl. No. 12/720,536, filed Mar. 9, 2010.
Final, dated Apr. 24, 2013, U.S. Appl. No. 12/720,536, filed Mar. 9, 2010.
Non-Final, dated Sep. 23, 2013, U.S. Appl. No. 12/820,061, filed Jun. 21, 2010.
Final, dated Jun. 11, 2013, U.S. Appl. No. 12/820,061, filed Jun. 21, 2010.
Non-Final, dated Feb. 25, 2013, U.S. Appl. No. 12/820,061, filed Jun. 21, 2010.
Non-Final, dated Jun. 9, 2011, U.S. Appl. No. 12/722,470, filed Mar. 11, 2010.
Advisory, dated Jun. 26, 2013, U.S. Appl. No. 13/089,202, filed Apr. 18, 2011.
Non-Final, dated Aug. 1, 2012, U.S. Appl. No. 13/089,202, filed Apr. 18, 2011.
Final, dated Apr. 8, 2013, U.S. Appl. No. 13/089,202, filed Apr. 18, 2011.
Final Office Action, dated Jul. 8, 2015, U.S. Appl. No. 12/720,536, filed Mar. 9, 2010.
Advisory Action, dated Jul. 20, 2015, U.S. Appl. No. 12/218,859, filed Jul. 17, 2008.
Notice of Allowance, dated Aug. 4, 2015, U.S. Appl. No. 13/685,372, filed Nov. 26, 2012.
Supplemental Notice of Allowability, dated Aug. 17, 2015, U.S. Appl. No. 13/685,372, filed Nov. 26, 2012.
Callison-Burch et al., "Findings of the 2011 Workshop on Statistical Machine Translation," In Proceedings of the Sixth Workshop on Statistical Machine Translation, Edinburgh, Scotland, July. Association for Computational Linguistics, 2011, pp. 22-64.
Bohar et al., "A Grain of Salt for the WMT Manual Evaluation," In Proceedings of the Sixth Workshop on Statistical Machine Translation, Edinburgh, Scotland, Association for Computational Linguistics, Jul. 2011, pp. 1-11.
Snover et al., "Fluency, Adequacy, or HTER? Exploring Different Human Judgements with a Tunable MT Metric", In Proceedings of the Fourth Workshop on Statitstical Machine Translation at the 12th Meeting of the EACL, pp. 259-268, 2009.
Kanthak et al., "Novel Reordering Approaches in Phrase-Based Statistical Machine Translation," In Proceedings of the ACL Workshop on Building and Using Parallel Texts, Jun. 2005, pp. 167-174.
Allauzen et al., "OpenFst: A General and Efficient Weighted Finitestate Transducer Library," In Proceedings of the 12th International Conference on Implementation and Application of Automata (CIAA), 2007, pp. 11-23.
Denkowski et al., "Meteor 1.3: Automatic Metric for Reliable Optimization and Evaluation of Machine Translation Systems," In Proceedings of the EMNLP 2011 Workshop on Statistical Machine Translation, Jul. 2011, pp. 85-91.
Crammer et al., "On the Algorithmic Implementation of Multi-Class SVMs," In Journal of Machine Learning Reseach 2, Dec. 2001, pp. 265-292.

* cited by examiner

| Desiderata | Auto. | Manu. | HyTER |
|---|---|---|---|
| Metric is intuitive | N | Y | Y |
| Metric is computed automatically | Y | N | Y |
| Metric is stable and reproducible from one evaluation to another | Y | N | Y |
| Metric works equally well when comparing human and automatic outputs and when comparing rule-based, statistical-based, and hybrid engines | N | Y | Y |
| System developers can tune to the metric | Y | N | Y |
| Metric helps developers identify deficiencies of MT engines | N | N | Y |

| Metric | Arabic-English ||| Chinese-English |||
|---|---|---|---|---|---|---|
| | Human mean | Machine mean | m/h | Human mean | Machine mean | m/h |
| [100-0]-BLEU, 1 ref | 59.90 | 69.14 | 1.15 | 71.86 | 84.34 | 1.17 |
| [100-0]-BLEU, 3 refs | 41.49 | 57.44 | 1.38 | 54.25 | 75.22 | 1.39 |
| [100-0]-Meteor, 1 ref | 60.13 | 65.70 | 1.09 | 66.81 | 73.66 | 1.10 |
| [100-0]-Meteor, 3 refs | 55.98 | 62.91 | 1.12 | 62.95 | 70.68 | 1.12 |
| [100-0]-TERp, 1 ref | 35.87 | 46.48 | 1.30 | 53.58 | 71.70 | 1.34 |
| [100-0]-TERp, 3 refs | 27.08 | 39.52 | 1.46 | 41.79 | 60.61 | 1.45 |
| HyTER U | 18.42 | 34.94 | 1.90 | 27.98 | 52.08 | 1.86 |
| HyTER SPU | 17.85 | 34.39 | 1.93 | 27.57 | 51.73 | 1.88 |
| [100-0]-Likert | 5.26 | 50.37 | 9.57 | 4.35 | 48.37 | 11.12 |

| Lang. | 0 | 0+ | 1 | 1+ | 2 | 2+ | 3 | 3+ |
|---|---|---|---|---|---|---|---|---|
| Chi. | 0.0 | 8.2 | 40.8 | 65.3 | 59.2 | 10.2 | 4.1 | 0.0 |
| Rus. | 0.0 | 2.8 | 12.7 | 42.3 | 60.6 | 46.5 | 25.4 | 5.6 |
| Spa. | 0.0 | 1.3 | 33.3 | 66.7 | 88.0 | 24.0 | 4.0 | 0.0 |
| All | 0.0 | 3.6 | 27.7 | 57.4 | 70.8 | 28.7 | 11.8 | 2.1 |

FIGURE 6C

| Level | Measure | Baseline | HyTER-enabled |
|---|---|---|---|
| All | Accuracy | 72.31 | 90.77 |
| 2 or better | Precision | 85.62 | 82.11 |
|  | Recall | 84.93 | 98.63 |
|  | $F_1$ | 85.27 | 89.62 |

FIGURE 6D

METHOD AND SYSTEM FOR AUTOMATIC MANAGEMENT OF REPUTATION OF TRANSLATORS

STATEMENT REGARDING FEDERALLY SPONSORED RESEARCH OR DEVELOPMENT

The U.S. Government may have certain rights in this invention pursuant to DARPA contract HR0011-11-C-0150 and TSWG contract N41756-08-C-3020.

FIELD OF THE INVENTION

The present invention relates generally to managing an electronic marketplace for translation services, and more specifically, to a method and system for determining an initial reputation of a translator using testing and adjusting the reputation based on service factors.

BACKGROUND

Translation of written materials from one language into another are required more often and are becoming more important as information moves globally and trade moves worldwide. Translation is often expensive and subject to high variability depending on the translator, whether human or machine.

Translations are difficult to evaluate since each sentence may be translated in more than one way.

Marketplaces are used to drive down costs for consumers, but typically require a level of trust by a user. Reputation of a seller may be communicated in any number of ways, including word of mouth and online reviews, and may help instill trust in a buyer for a seller.

SUMMARY OF THE INVENTION

According to exemplary embodiments, the present invention provides a method that includes receiving a result word set in a target language representing a translation of a test word set in a source language. When the result word set is not in a set of acceptable translations, the method includes measuring a minimum number of edits to transform the result word set into a transform word set. The transform word set is one of the set of acceptable translations.

A system is provided that includes a receiver to receive a result word set in a target language representing a translation of a test word set in a source language. The system also includes a counter to measure a minimum number of edits to transform the result word set into a transform word set when the result word set is not in a set of acceptable translations. The transform word set is one of the set of acceptable translations.

A method is provided that includes determining a translation ability of a human translator based on a test result. The method also includes adjusting the translation ability of the human translator based on historical data of translations performed by the human translator.

These and other advantages of the present invention will be apparent when reference is made to the accompanying drawings and the following description.

BRIEF DESCRIPTION OF THE DRAWINGS

FIGS. 6A to 6D are tables illustrating various aspects of the exemplary method;

DETAILED DESCRIPTION OF EXEMPLARY EMBODIMENTS

Figure 1A:
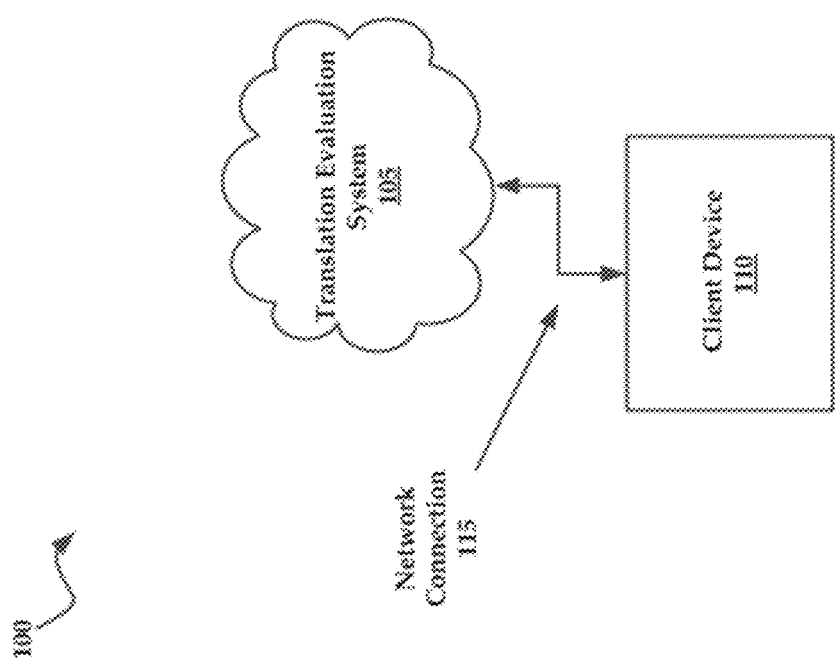
FIG. 1A illustrates an exemplary system for practicing aspects of the present technology.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. According to exemplary embodiments, the present technology relates generally to translations services. More specifically, the present invention provides a system and method for evaluating the translation ability of a human or machine translator, and for ongoing reputation management of a human translator.

FIG. 1A illustrates an exemplary system 100 for practicing aspects of the present technology. The system 100 may include a translation evaluation system 105 that may be implemented in a cloud-based computing environment. A cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In other embodiments, the translation evaluation system 105 may include a distributed group of computing devices such as web servers that do not share computing resources or workload. Additionally, the translation evaluation system 105 may include a single computing system that has been provisioned with a plurality of programs that each produces instances of event data.

Users offering translation services and/or users requiring translation services may interact with the translation evaluation system 105 via a client device 110, such as an end user computing system or a graphical user interface. The translation evaluation system 105 may communicatively couple with the client device 110 via a network connection 115. The network connection 115 may include any one of a number of private and public communications mediums such as the Internet.

In some embodiments, the client device 110 may communicate with the translation evaluation system 105 using a secure application programming interface or API. An API allows various types of programs to communicate with one another in a language (e.g., code) dependent or language agnostic manner.

Figure 1B:
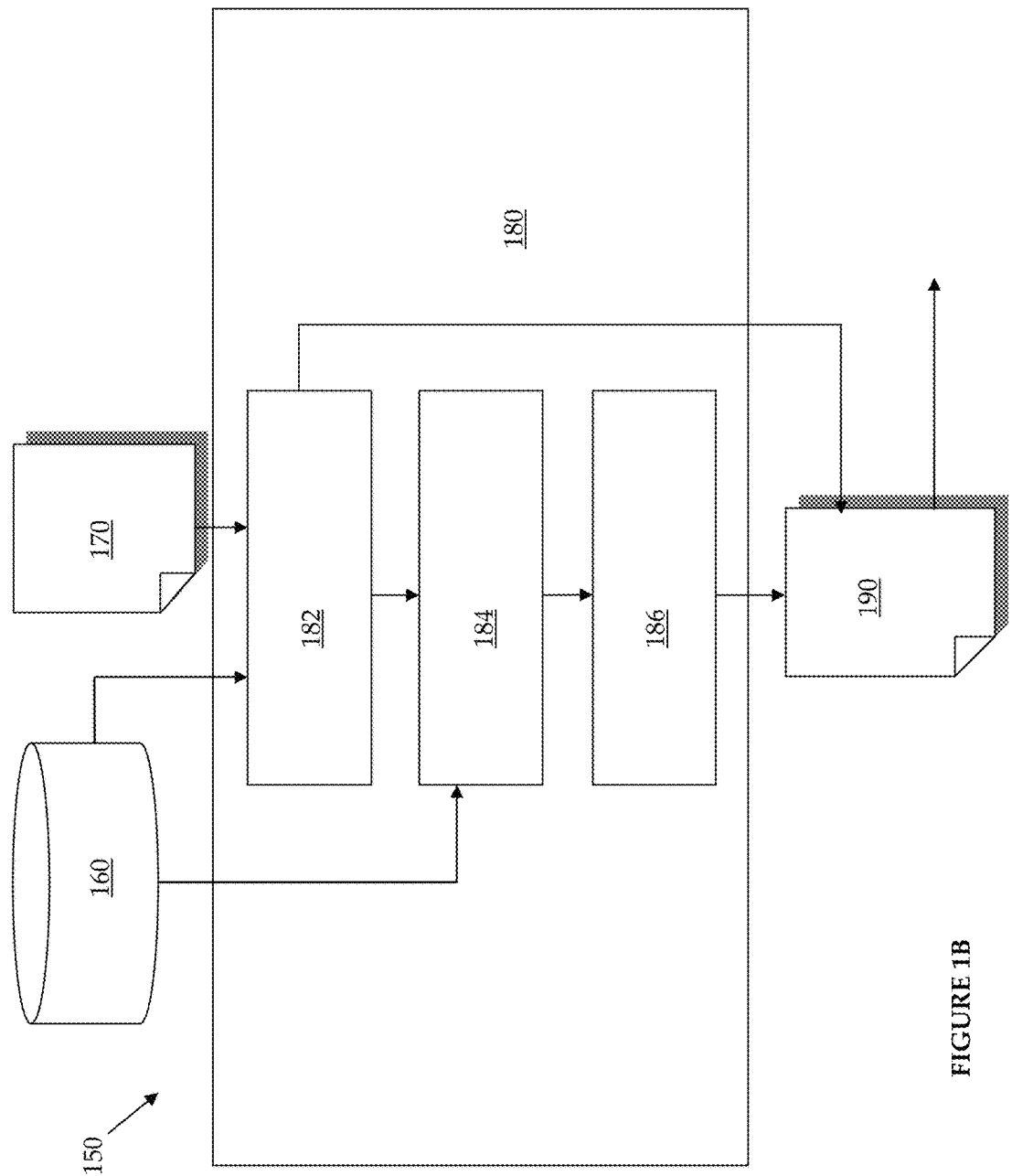
FIG. 1B is a schematic diagram illustrating an exemplary process flow through an exemplary system.

FIG. 1B is a schematic diagram illustrating an exemplary process flow through translation evaluation system 150. Translation evaluation system 150 is used to evaluate translation 170, which is a translation of a source language test word set by a human translator or a machine translator. Translation 170 is input into comparator 182 of evaluator 180. Comparator 182 accesses acceptable translation database 160, which includes a set of acceptable translations of the source language test word set, and determines if there is an identity relationship between translation 170 and one of the acceptable translations. If there is an identity relationship, then score 190 is output as a perfect score, which may be a "0". Otherwise, the flow in the system proceeds to transformer 184, which also accesses acceptable translation database 160. Acceptable translation database 160 may be populated by human translators or machine translators, or some combination of the two. The techniques described herein may be used to populate acceptable translation database 160 based on outputs of multiple translators. Transformer 184 determines the minimum number of edits required to change translation 170 into one of the acceptable translations. An edit may be a substitution, a deletion, an insertion, and/or a move of a word in translation 170. After the minimum number of edits is determined, the flow proceeds to counter 186, which counts the minimum number of edits and other translation characteristics such as n-gram overlap between the two translations. The number of edits need to transform translation 170 into one of the acceptable translations is then output from evaluator 180 as score 190.

During the last decade, automatic evaluation metrics have helped researchers accelerate the pace at which they improve machine translation (MT) systems. Human-assisted metrics have enabled and supported large-scale U.S. government sponsored programs. However, these metrics have started to show signs of wear and tear.

Automatic metrics are often criticized for providing non-intuitive scores—for example, few researchers can explain to casual users what a BLEU score of 27.9 means. And researchers have grown increasingly concerned that automatic metrics have a strong bias towards preferring statistical translation outputs; the NIST (2008, 2010), MATR (Gao et al., 2010) and WMT (Callison-Burch et al., 2011) evaluations held during the last five years have provided ample evidence that automatic metrics yield results that are inconsistent with human evaluations when comparing statistical, rule-based, and human outputs.

In contrast, human-informed metrics have other deficiencies: they have large variance across human judges (Bojar et al., 2011) and produce unstable results from one evaluation to another (Przybocki et al., 2011). Because evaluation scores are not computed automatically, systems developers cannot automatically tune to human-based metrics.

FIG. 6A is table 600 illustrating properties of evaluation metrics including an automatic metric, a human metric, and a proposed metric. FIG. 6A summarizes the dimensions along which evaluation metrics should do well and the strengths and weaknesses of the automatic and human-informed metrics proposed to date. One goal is to develop metrics that do well along all these dimensions. The failures of current automatic metrics are not algorithmic: BLEU, Meteor, TER (Translation Edit Rate), and other metrics efficiently and correctly compute informative distance functions between a translation and one or more human references. These metrics fail simply because they have access to sets of human references that are too small. Access to the set of all correct translations of a given sentence would enable measurement of the minimum distance between a translation and the set. When a translation is perfect, it can be found in the set, so it requires no editing to produce a perfect translation. Therefore, its score should be zero. If the translation has errors, the minimum number of edits (substitutions, deletions, insertions, moves) needed to rewrite the translation into the "closest" reference in the set can be efficiently computed. Current automatic evaluation metrics do not assign their best scores to most perfect translations because the set of references they use is too small; their scores can therefore be perceived as less intuitive.

Following these considerations, an annotation tool is provided that enables one to efficiently create an exponential number of correct translations for a given sentence, and present a new evaluation metric, HyTER, which efficiently exploits these massive reference networks. The following description describes an annotation environment, process, and meaning-equivalent representations. A new metric, the HyTER metric, is presented. This new metric provides better support than current metrics for machine translation evaluation and human translation proficiency assessment. A web-based annotation tool can be used to create a representation encoding an exponential number of meaning equivalents for a given sentence. The meaning equivalents are constructed in a bottom-up fashion by typing translation equivalents for larger and larger phrases. For example, when building the meaning equivalents for the Spanish phrase "el primer ministro italiano Silvio Berlusconi", the annotator may first type in the meaning equivalents for "primer ministro"—prime-minister; PM; prime minister; head of government; premier; etc.; "italiano"—Italiani; and "Silvio Berlusconi"—Silvio Berlusconi; Berlusconi. The tool creates a card that stores all the alternative meanings for a phrase as a determined finite-state acceptor (FSA) and gives it a name in the target language that is representative of the underlying meaning-equivalent set: [PRIME-MINISTER], [ITALIAN], and [SILVIO-BERLUSCONI]. Each base card can be thought of as expressing a semantic concept. A combination of existing cards and additional words can be subsequently used to create larger meaning equivalents that cover increasingly larger source sentence segments. For example, to create the meaning equivalents for "el primer ministro italiano" one can drag-and-drop existing cards or type in new words: the [ITALIAN] [PRIME-MINISTER]; the [PRIME-MINISTER] of Italy; to create the meaning equivalents for "el primer ministro italiano Silvio Berlusconi", one can drag-and-drop and type: [SILVIO-BERLUSCONI], [THE-ITALIAN-PRIME-MINISTER]; [THE-ITALIAN-PRIME-MINISTER], [SILVIO-BERLUSCONI]; [THE-ITALIAN-PRIME-MINISTER] [SILVIO-BERLUSCONI]. All meaning equivalents associated with a given card are expanded and used when that card is re-used to create larger meaning equivalent sets.

Figure 8:
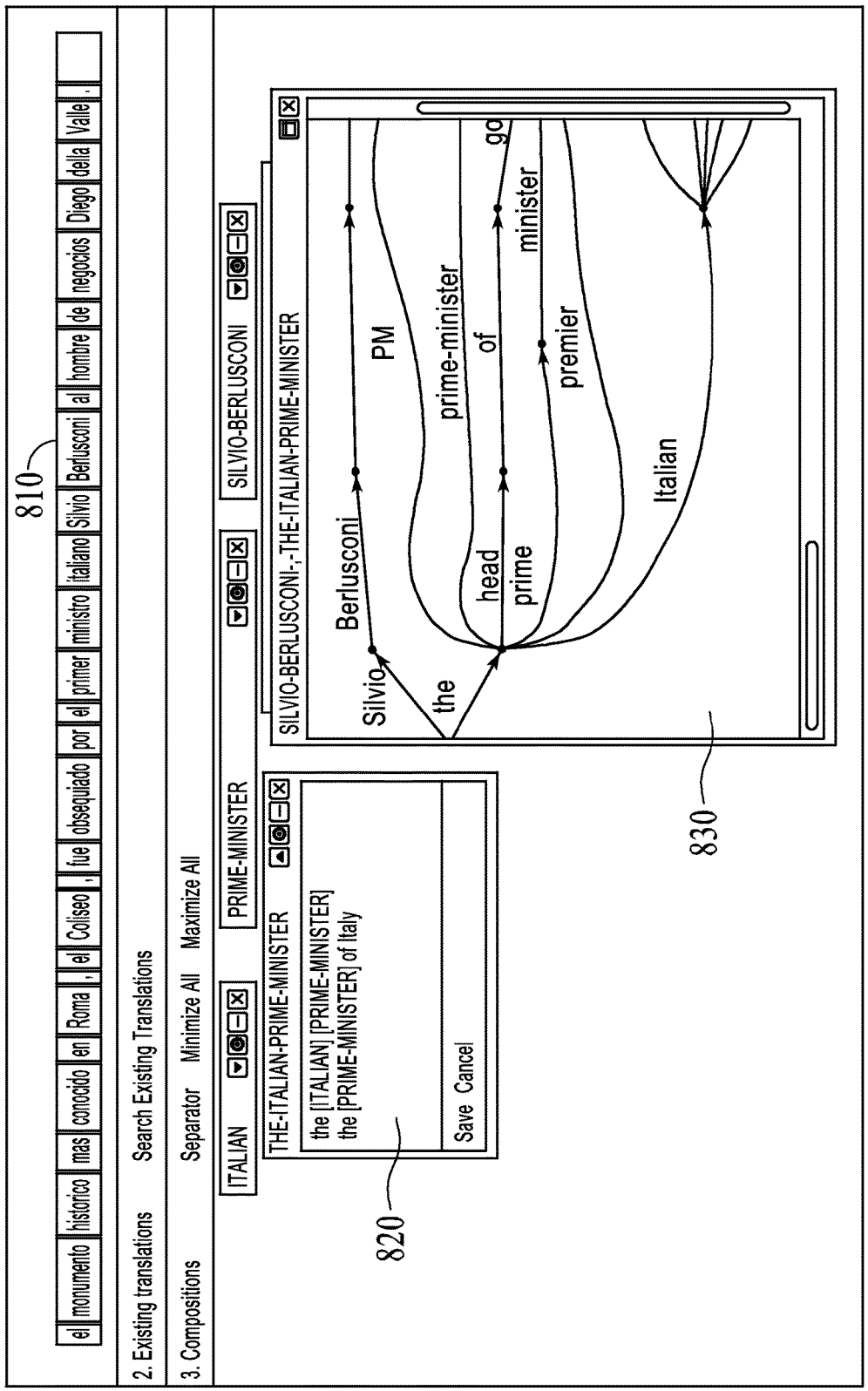
FIG. 8 illustrates a graphical user interface for building large networks of meaning equivalents.
Figure 9A:
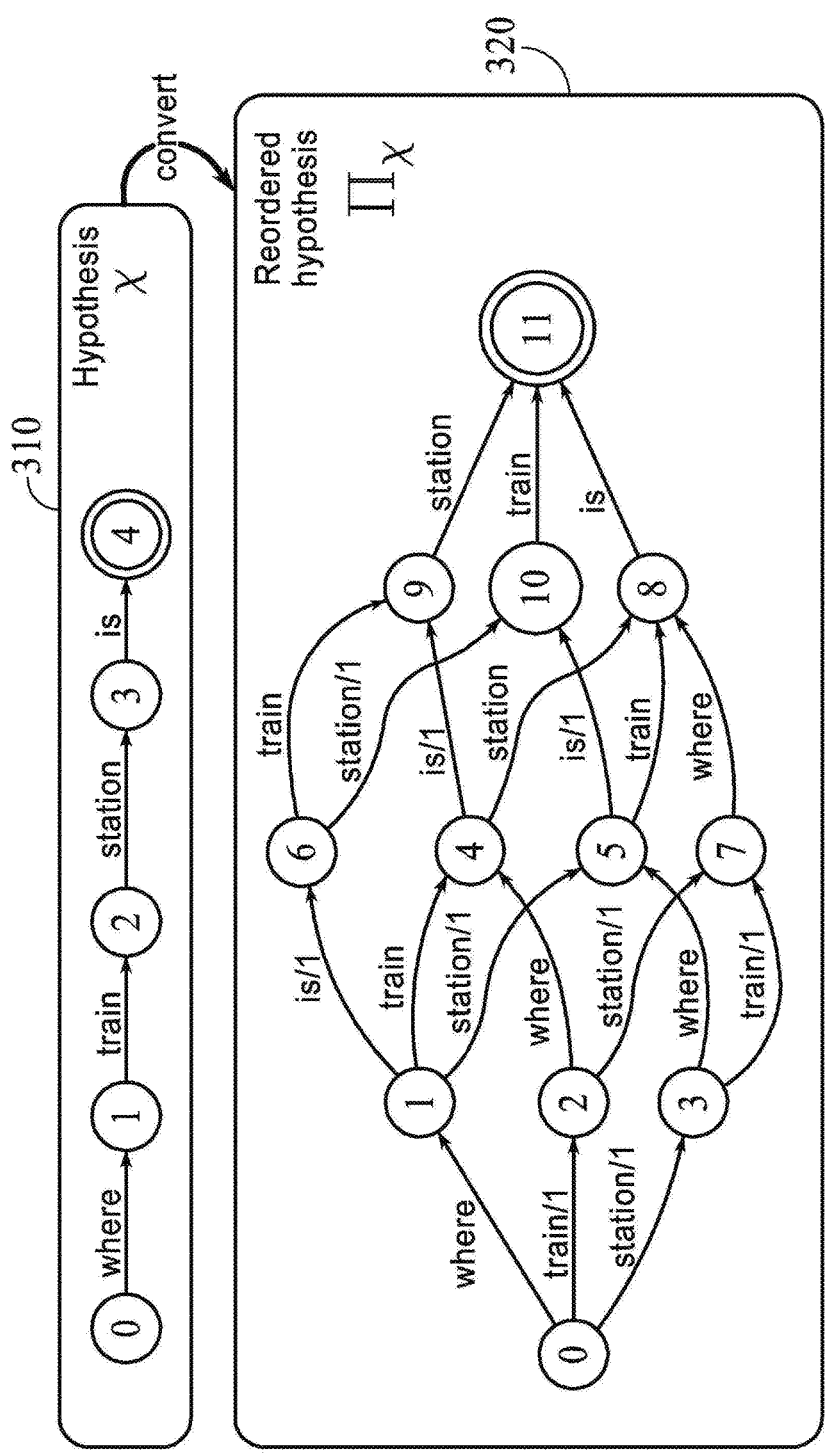
FIGS. 9A, 9B, and 9C present the content of FIG. 9 as three partial views that form the single complete view of FIG. 9.
Figure 9B:
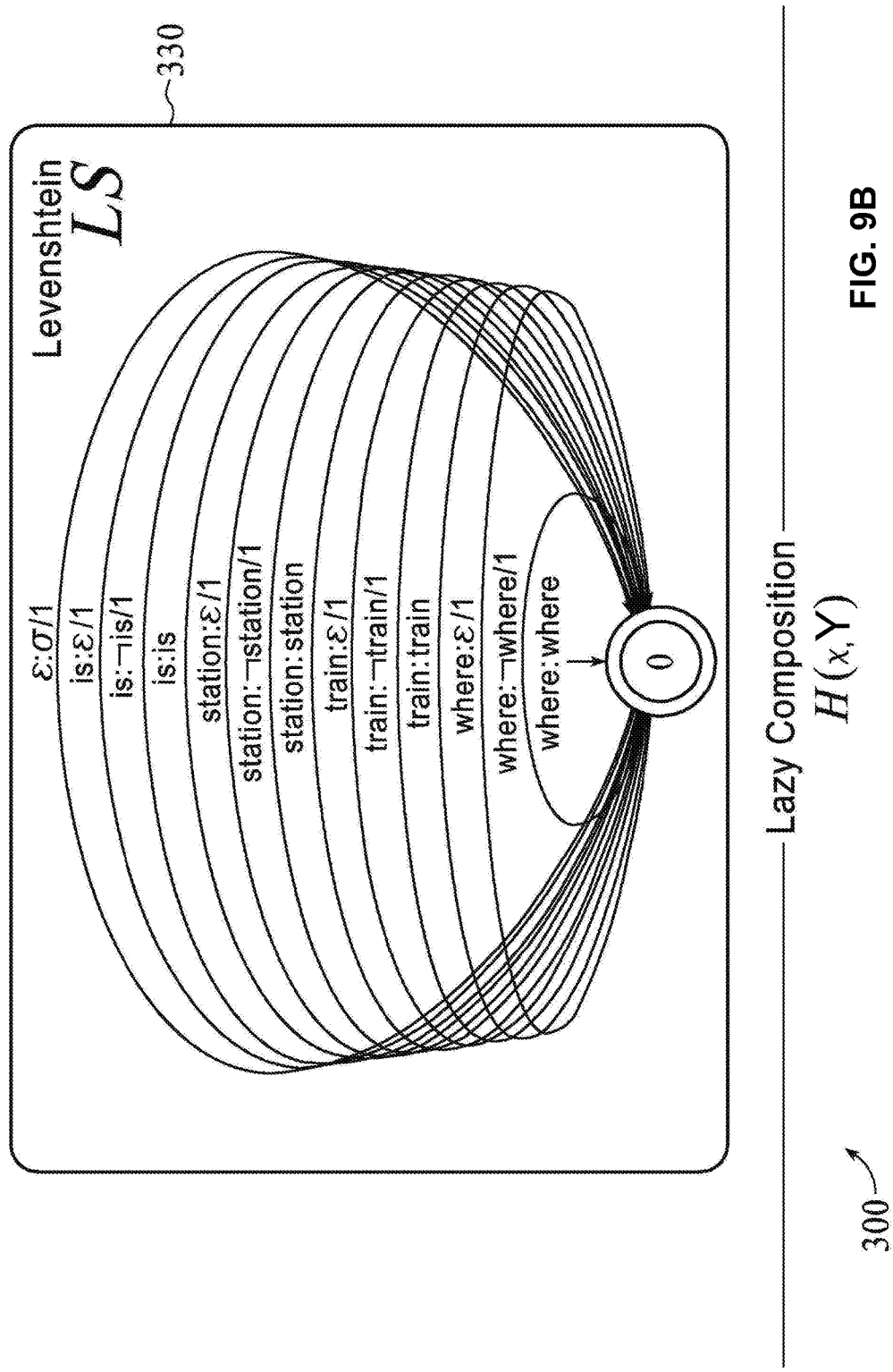
Figure 9C:
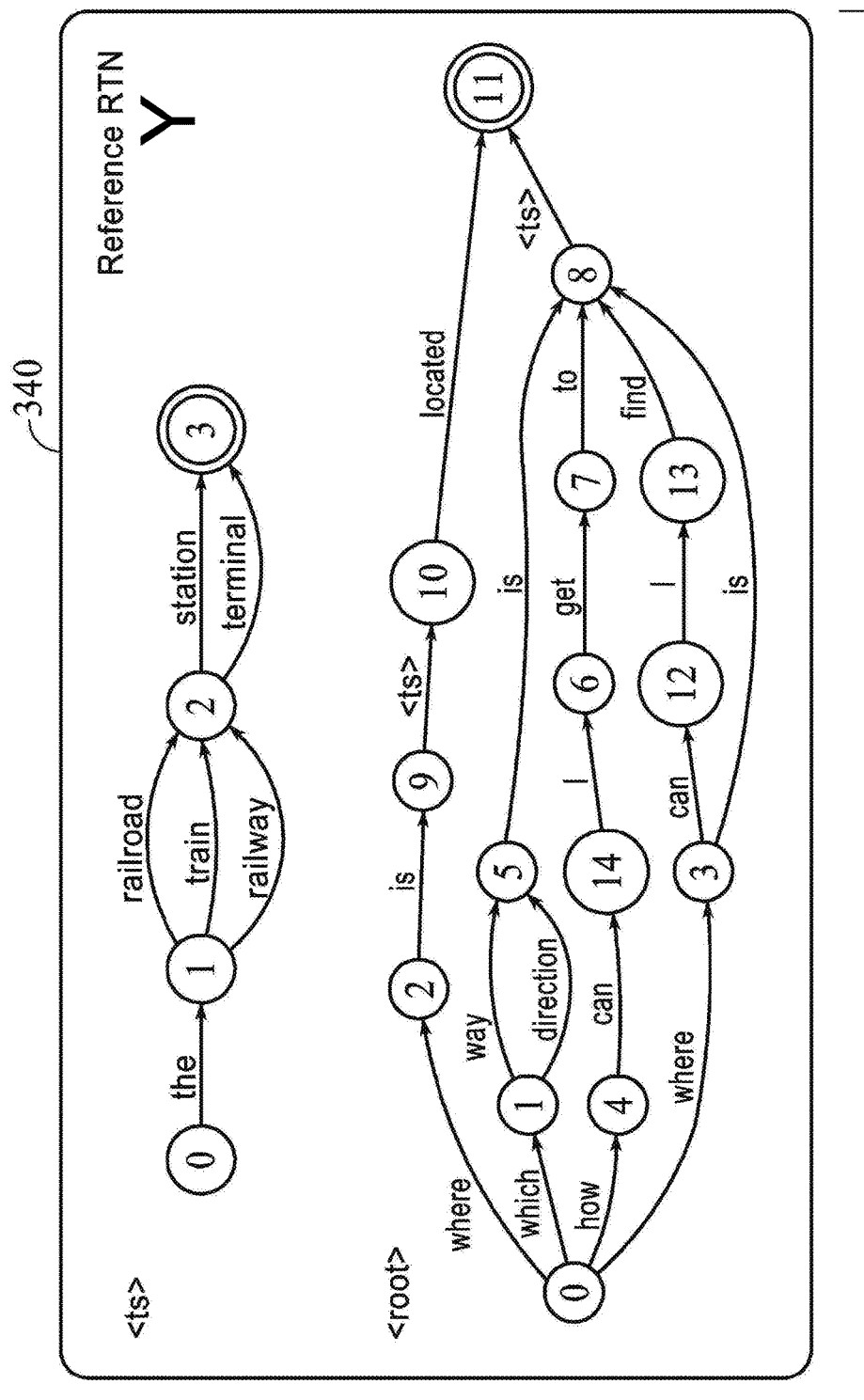

FIG. 8 illustrates graphical user interface (GUI) 800 for building large networks of meaning equivalents. Source sentence 810 is displayed within GUI 800, and includes several strings of words. One string of words in source sentence 810 has been translated in two different ways. The two acceptable translations of the string are displayed in acceptable translation area 820. All possible acceptable translations are produced by the interface software by combining hierarchically the elements of several possible acceptable translations for sub-strings of the source string of source sentence 810. The resulting lattice 830 of acceptable sub-string translations illustrates all acceptable alternative translations that correspond to a given text segment.

The annotation tool supports, but does not enforce, re-use of annotations created by other annotators. The resulting meaning equivalents are stored as recursive transition networks (RTNs), where each card is a subnetwork; if needed, these non-cyclic RTNs can be automatically expanded into finite-state acceptors (FSAs). Using the annotation tool, meaning-equivalent annotations for 102 Arabic and 102 Chinese sentences have been created—a subset of the "progress set" used in the 2010 Open MT NIST evaluation (the average sentence length was 24 words). For each sentence, four human reference translations produced by LDC and five MT system outputs were accessed, which were selected by NIST to cover a variety of system architectures (statistical, rule-based, hybrid) and performances. For each MT output, sentence-level HTER scores (Snover et al., 2006) were accessed, which were produced by experienced LDC annotators.

Three annotation protocols may be used: 1) Ara-A2E and Chi-C2E: Foreign language natives built English networks starting from foreign language sentences; 2) Eng-A2E and Eng-C2E: English natives built English networks starting from "the best translation" of a foreign language sentence, as identified by NIST; and 3) Eng*-A2E and Eng*-C2E: English natives built English networks starting from "the best translation". Additional, independently produced human translations may be used and/or accessed to boost creativity.

Each protocol may be implemented independently by at least three annotators. In general, annotators may need to be fluent in the target language, familiar with the annotation tool provided, and careful not to generate incorrect paths, but they may not need to be linguists.

Multiple annotations may be exploited by merging annotations produced by various annotators, using procedures such as those described below. For each sentence, all networks that were created by the different annotators are combined. Two different combination methods are evaluated, each of which combines networks N1 and N2 of two annotators (see, for example, FIG. 2). First, the standard union U(N1;N2) operation combines N1 and N2 on the whole-network level. When traversing U(N1;N2), one can follow a path that comes from either N1 or N2. Second, source-phrase-level union SPU(N1;N2) may be used. As an alternative, SPU is a more fine-grained union which operates on sub-sentence segments. Each annotator explicitly aligns each of the various subnetworks for a given sentence to a source span of that sentence. Now for each pair of subnetworks (S1; S2) from N1 and N2, their union is built if they are compatible. Two subnetworks S1; S2 are defined to be compatible if they are aligned to the same source span and have at least one path in common.

Figure 2:
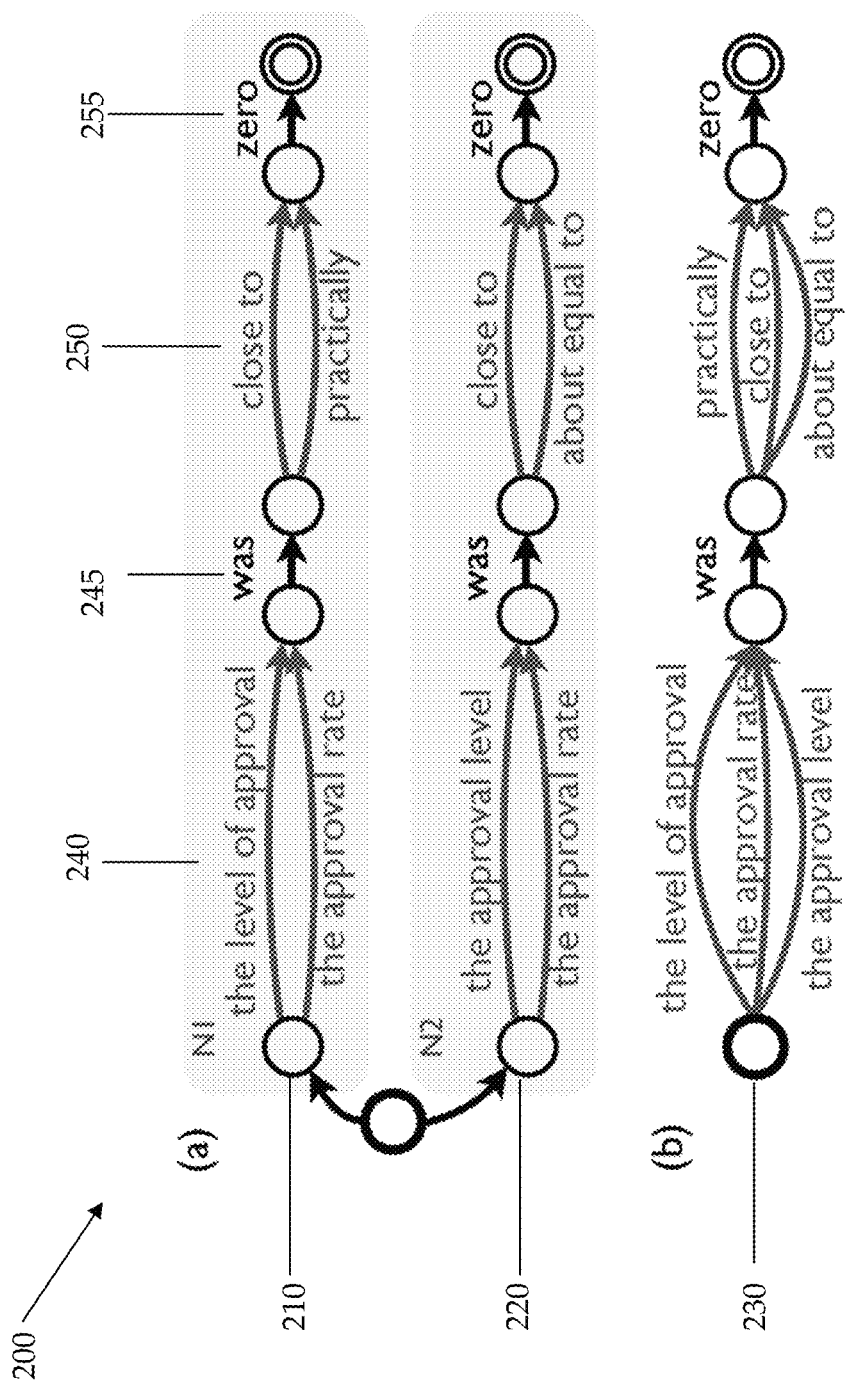
FIG. 2 is a schematic diagram illustrating an exemplary method for constructing a set of acceptable translations.

FIG. 2 is a schematic diagram illustrating exemplary method 200 for constructing a set of acceptable translations. First deconstructed translation set 210 represents a deconstructed translation of a source word set, in this case a sentence, made by a first translator. First deconstructed translation set 210 is a sentence divided into four parts, subject clause 240, verb 245, adverbial clause 250, and object 255. Subject clause 240 is translated by the first translator in one of two ways, either "the level of approval" or "the approval rate". Likewise, adverbial clause 250 is translated by the first translator in one of two ways, either "close to" or "practically". Both verb 245 and object 255 are translated by the first translator in only one way, namely "was" and "zero", respectively. First deconstructed translation set 210 generates four (due to the multiplication of the different possibilities, namely two times one times two times one) acceptable translations.

A second translator translates the same source word set to arrive at second deconstructed translation set 220, which includes overlapping but not identical translations, and also generates four acceptable translations. One of the translations generated by second deconstructed translation set 220 is identical to one of the translations generated by first deconstructed translation set 210, namely "the approval rate was close to zero". Therefore, the union of the outputs of first deconstructed translation set 210 and second deconstructed translation set 220 yields seven acceptable translations. This is one possible method of populating a set of acceptable translations.

However, a larger, more complete set of acceptable translations may result from combining elements of subject clause 240, verb 245, adverbial clause 250, and object 255 for both first deconstructed translation set 210 and second deconstructed translation set 220 to yield third deconstructed translation set 230. Third deconstructed translation set 230 generates nine (due to the multiplication of the different possibilities, namely three times one times three times one) acceptable translations. Third deconstructed translation set 230 generates two additional translations that do not result from the union of the outputs of first deconstructed translation set 210 and second deconstructed translation set 220 yields. In particular, third deconstructed translation set 230 generates additional translation "the approval level was practically zero" and "the level of approval was about equal to zero". In this manner, a large set of acceptable translations can be generated from the output of two translators.

The purpose of source-phrase-level union (SPU) is to create new paths by mixing paths from N1 and N2. In FIG. 2, for example, the path "the approval level was practically zero" is contained in the SPU, but not in the standard union. SPUs are built using a dynamic programming algorithm that builds subnetworks bottom-up, thereby building unions of intermediate results. Two larger subnetworks can be compatible only if their recursive smaller subnetworks are compatible. Each SPU contains at least all paths from the standard union.

Some empirical findings may characterize the annotation process and the created networks. When comparing the productivity of the three annotation protocols in terms of the number of reference translations that they enable, the target language natives that have access to multiple human references produce the largest networks. The median number of paths produced by one annotator under the three protocols varies from 7.7 times 10 to the $5^{th}$ power paths for Ara-A2E, to 1.4 times 10 to the $8^{th}$ power paths for Eng-A2E, to 5.9 times 10 to the $8^{th}$ power paths for Eng*-A2E. In Chinese, the medians vary from 1.0 times 10 to the $5^{th}$ power for Chi-C2E, to 1.7 times 10 to the $8^{th}$ power for Eng-C2E, to 7.8 times 10 to the $9^{th}$ power for Eng*-C2E.

A metric for measuring translation quality with large reference networks of meaning equivalents is provided, and is entitled HyTER (Hybrid Translation Edit Rate). HyTER is an automatically computed version of HTER (Snover et al., 2006). HyTER computes the minimum number of edits between a translation x (hypothesis x 310 of FIG. 3) and an exponentially sized reference set Y, which may be encoded as a Recursive Transition Network (Reference RTN Y 340 of FIG. 3). Perfect translations may have a HyTER score of 0.

Figure 3:
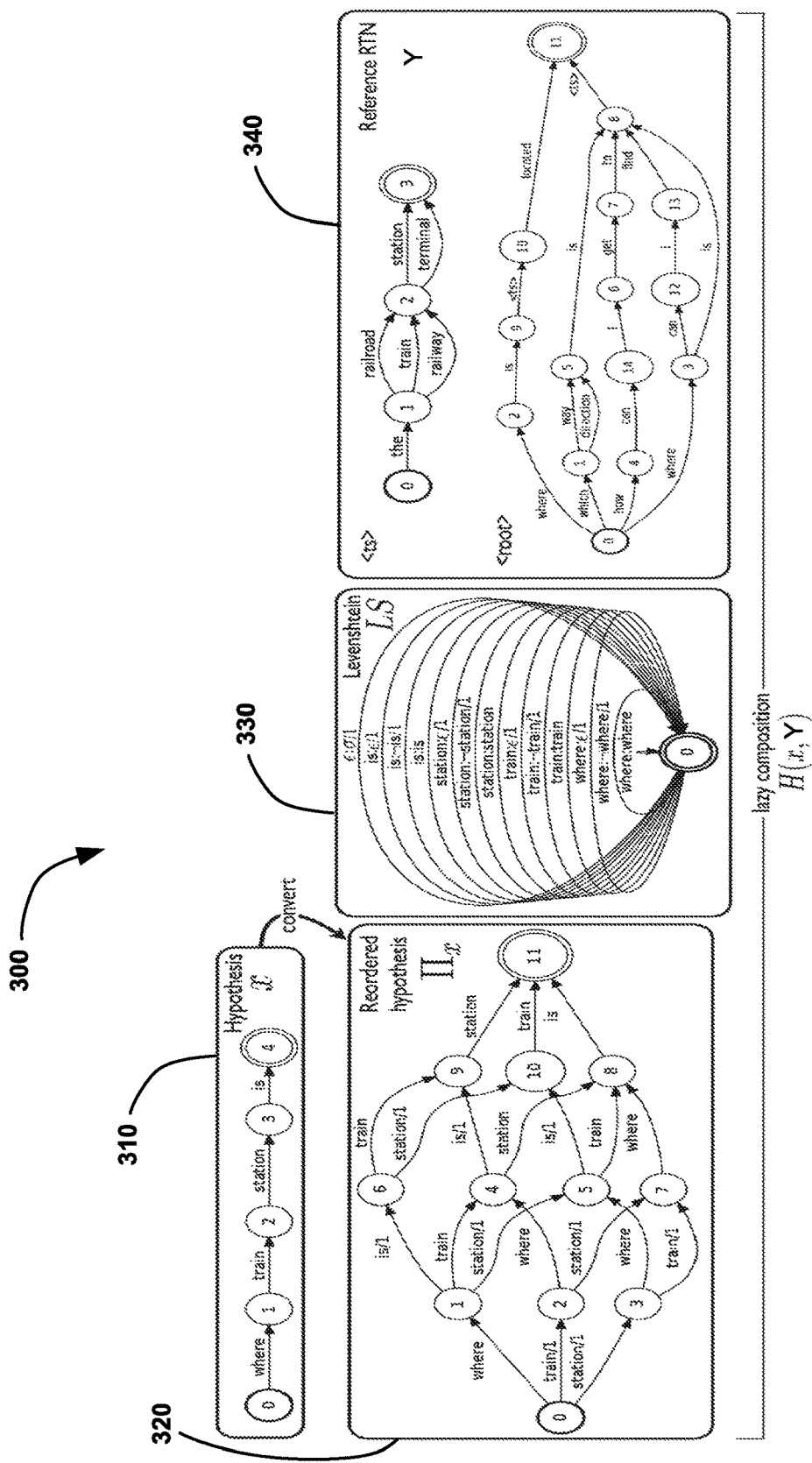
FIG. 3 is a schematic diagram illustrating an exemplary method for developing a search space.

FIG. 3 is a schematic diagram illustrating a model 300 for developing a search space. The model 300 includes a hypothesis-x 310, a reordered hypothesis Πx 320, a Levenshtein transducer 330, and a reference RTN Y 340. The model 300 illustrates a lazy composition H(x;Y) of the reordered hypothesis Πx 320, the Levenshtein transducer 330, and the reference RTN Y 340. An unnormalized HyTER score may be defined and normalized by the number of words in the found closest path. This minimization problem may be treated as graph-based search. The search space over which we minimize is implicitly represented as the Recursive Transition Network H, where gamma x is encoded as a weighted FSA that represents the set of permutations of x (e.g., "Reordered hypotheses Πx 320" in FIG. 3 that represents permutations of Hypothesis x 310) with their associated distance costs, and LS is the one-state Levenshtein transducer 330 whose output weight for a string pair (x,y) is the Levenshtein distance between x and y, and symbol H(x,Y) denotes a lazy composition of the Reordered hypotheses Πx 320, the Levenshtein transducer 330, and the reference RTN Y 340, as illustrated in FIG. 3. The model 300 is depicted in FIG. 3, which is a schematic diagram illustrating an exemplary method for developing a search space H(x,Y).

An FSA gamma-x-allows permutations (Π320) according to certain constraints. Allowing all permutations of the hypothesis x 310 would increase the search space to factorial size and make inference NP-complete (Cormode and Muthukrishnan, 2007). Local-window constraints (see, e.g., Kanthak et al. (2005)) are used, where words may move within a fixed window of size k. These constraints are of size O(n) with a constant factor k, where n is the length of the translation hypothesis x 310. For efficiency, lazy evaluation may be used when defining the search space H(x;Y). Gamma-x may never be explicitly composed, and parts of the composition that the inference algorithm does not explore may not be constructed, saving computation time and memory. Permutation paths Πx 320 in gamma-x may be constructed on demand. Similarly, the reference set Y 340 may be expanded on demand, and large parts of the reference set Y 340 may remain unexpanded.

These on-demand operations are supported by the OpenFst library (Allauzen et al., 2007). Specifically, to expand the RTNs into FSAs, the Replace operation may be used. To compute some data, any shortest path search algorithm may be applied. Computing the HyTER score may take 30 ms per sentence on networks by single annotators (combined all-annotator networks: 285 ms) if no reordering is used. These numbers increase to 143 ms (1.5 secs) for local reordering with window size 3, and 533 ms (8 secs) for window size 5. Many speedups for computing the score with reorderings are possible. However using reordering does not give consistent improvements.

As a by-product of computing the HyTER score, one can obtain the closest path itself, for error analysis. It can be useful to separately count the numbers of insertions, deletions, etc., and inspect the types of error. For example, one may find that a particular system output tends to be missing the finite verb of the sentence or that certain word choices were incorrect.

Meaning-equivalent networks may be used for machine translation evaluation. Experiments were designed to measure how well HyTER performs, compared to other evaluation metrics. For these experiments, 82 of the 102 available sentences were sampled, and 20 sentences were held out for future use in optimizing the metric.

Differentiating human from machine translation outputs may be achieved by scoring the set of human translations and machine translations separately, using several popular metrics, with the goal of determining which metric performs better at separating machine translations from human translations. To ease comparisons across different metrics, all scores may be normalized to a number between 0 (best) and 100 (worst). FIG. 6B shows the normalized mean scores for the machine translations and human translations under multiple automatic and one human evaluation metric (Likert). FIG. 6B is table 610 illustrating scores assigned to human versus machine translations under various metrics. Each score is normalized to range from 100 (worst) to 0 (perfect translation). The quotient of interest, m=h, is the mean score for machine translations divided by the mean score for the human translations. The higher this number, the better a metric separates machine from human produced outputs.

Under HyTER, m=h is about 1.9, which shows that the HyTER scores for machine translations are, on average, almost twice as high as for human translations. Under Likert (a score assigned by human annotators who compare pairs of sentences at a time), the quotient is higher, suggesting that human raters make stronger distinctions between human and machine translations. The quotient is lower under the automatic metrics Meteor (Version 1.3, (Denkowski and Lavie, 2011)), BLEU and TERp (Snover et al., 2009). These results show that HyTER separates machine from human translations better than alternative metrics.

Figure 7:
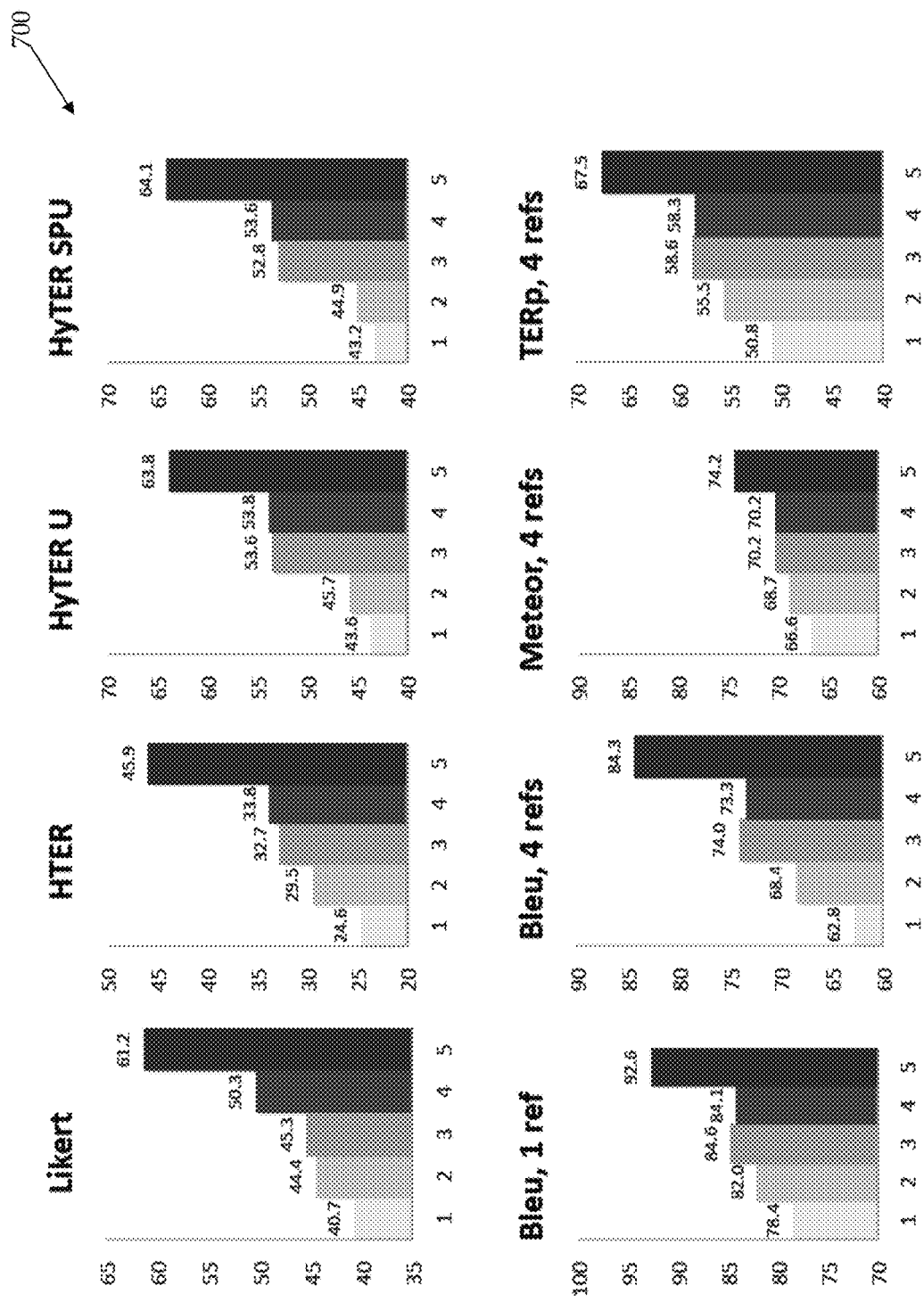
FIG. 7 compares rankings of five machine translation systems according to several widely used metrics.

The five machine translation systems are ranked according to several widely used metrics (see FIG. 7). The results show that BLEU, Meteor and TERp do not rank the systems in the same way as HTER and humans do, while the HyTER metric may yield a better ranking. Also, separation between the quality of the five systems is higher under HyTER, HTER, and Likert than under alternative metrics.

The current metrics (e.g., BLEU, Meteor, TER) correlate well with HTER and human judgments on large test corpora (Papineni et al., 2002; Snover et al., 2006; Lavie and Denkowski, 2009). However, the field of MT may be better served if researchers have access to metrics that provide high correlation at the sentence level as well. To this end, the correlation of various metrics with the Human TER (HTER) metric for corpora of increasingly larger sizes is estimated.

Language Testing units assess the translation proficiency of thousands of applicants interested in performing language translation work for the US Government and Commercial Language Service Organizations. Job candidates may typically take a written test in which they are asked to translate four passages (i.e., paragraphs) of increasing difficulty into English. The passages are at difficulty levels 2, 2+, 3, and 4 on the Interagency Language Roundable (ILR) scale. The translations produced by each candidate are manually reviewed to identify mistranslation, word choice, omission, addition, spelling, grammar, register/tone, and meaning distortion errors. Each passage is then assigned one of five labels: Successfully Matches the definition of a successful translation (SM); Mostly Matches the definition (MM); Intermittently Matches (IM); Hardly Matches (HM); Not Translated (NT) for anything where less than 50% of a passage is translated. There are a set of more than 100 rules that agencies practically use to assign each candidate an ILR translation proficiency level: 0, 0+, 1, 1+, 2, 2+, 3, and 3+. For example, a candidate who produces passages labeled as SM, SM, MM, IM for difficulty levels 2, 2+, 3, and 4, respectively, is assigned an ILR level of 2+.

The assessment process described above can be automated. To this end, the exam results of 195 candidates were obtained, where each exam result consists of three passages translated into English by a candidate, as well as the manual rating for each passage translation (i.e., the gold labels SM, MM, IM, HM, or NT). 49 exam results are from a Chinese exam, 71 from a Russian exam and 75 from a Spanish exam. The three passages in each exam are of difficulty levels 2, 2+, and 3; level 4 is not available in the data set. In each exam result, the translations produced by each candidate are sentence-aligned to their respective foreign sentences. The passage-to-ILR mapping rules described above are applied to automatically create a gold overall ILR assessment for each exam submission. Since the languages used here have only 3 passages each, some rules map to several different ILR ratings. FIG. 6C shows the label distribution at the ILR assessment level across all languages. FIG. 6C is table 620 illustrating the percentage of exams with ILR levels 0, 0+, . . . , 3+ as gold labels. Multiple levels per exam are possible.

The proficiency of candidates who take a translation exam may be automatically assessed. This may be a classification task where, for each translation of the three passages, the three passage assessment labels, as well as one overall ILR rating, may be predicted. In support of the assessment, annotators created an English HyTER network for each foreign sentence in the exams. These HyTER networks then serve as English references for the candidate translations. The median number of paths in these HyTER networks is 1.6 times 10 to the $6^{th}$ paths/network.

A set of submitted exam translations, each of which is annotated with three passage-level ratings and one overall ILR rating, is used. Features are developed that describe each passage translation in its relation to the HyTER networks for the passage. A classifier is trained to predict passage-level ratings given the passage-level features that describe the candidate translation. As a classifier, a multi-class support-vector machine (SVM, Krammer and Singer (2001)) may be used. In decoding, a set of exams without their ratings may be observed, the features derived, and the trained SVM used to predict ratings of the passage translations. An overall ILR rating based on the predicted passage-level ratings may be derived. A 10-fold cross-validation may be run to compensate for the small dataset.

Features describing a candidate's translation with respect to the corresponding HyTER reference networks may be defined. Each of the feature values is computed based on a passage translation as a whole, rather than sentence-by-sentence. As features, the HyTER score is used, as well as the number of insertions, deletions, substitutions, and insertions-or-deletions. These numbers are used when normalized by the length of the passage, as well as when unnormalized. N-gram precisions (for n=1, . . . , 20) are also used as features. The actual assignment of reputation may additionally be based on one or more of several other test-related factors.

Predicting the ILR score for a human translator, is not a requirement for performing the exemplary method described herein. Rather, it is one possible way to grade human translation proficiency. Reputation assignment according to the present technology can be done consistent with ILR, the American Translation Association (ATA) certification, and/or several other non-test related factors (for example price, response time, etc). The exemplary method shown herein utilizes ILR, but the same process may be applied for the ATA certification. The non-test specific factors pertain to creating a market space and enable the adjustment of a previous reputation based on market participation data.

The accuracy in predicting the overall ILR rating of the 195 exams is shown in table 630 of FIG. 6D. The results in two or better show how well a performance level of 2, 2+, 3 or 3+ can be predicted. It is important to retrieve such relatively good exams with high recall, so that a manual review QA process can confirm the choices while avoid discarding qualified candidates. The results show that high recall is reached while preserving good precision. Several possible gold labels per exam are available, and therefore precision and recall are computed similar to precision and recall in the NLP task of word alignment. As a baseline method, the most frequent label per language may be assigned. These are 1+ for Chinese, and 2 for Russian and Spanish. The results in FIG. 6D suggest that the process of assigning a proficiency level to human translators can be automated.

The present application introduces an annotation tool and process that can be used to create meaning-equivalent networks that encode an exponential number of translations for a given sentence. These networks can be used as foundation for developing improved machine translation evaluation metrics and automating the evaluation of human translation proficiency. Meaning-equivalent networks can be used to support interesting research programs in semantics, paraphrase generation, natural language understanding, generation, and machine translation.

Figure 4:
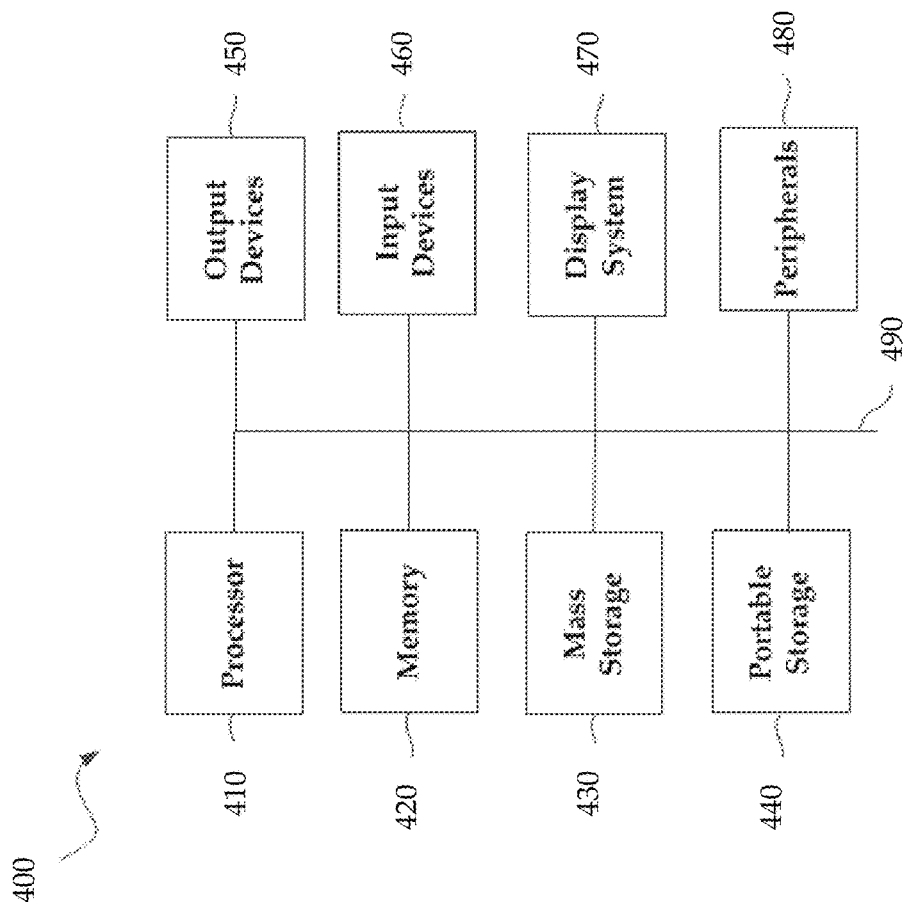
FIG. 4 illustrates an exemplary computing device that may be used to implement an embodiment of the present technology.

FIG. 4 illustrates exemplary computing device 400 that may be used to implement an embodiment of the present technology. The computing device 400 of FIG. 4 includes one or more processors 410 and main memory 420. Main memory 420 stores, in part, instructions and data for execution by the one or more processors 410. Main memory 420 may store the executable code when in operation. The computing device 400 of FIG. 4 further includes a mass storage device 430, portable storage medium drive(s) 440, output devices 450, user input devices 460, a display system 470, and peripheral device(s) 480.

The components shown in FIG. 4 are depicted as being connected via a single bus 490. The components may be connected through one or more data transport means. The one or more processors 410 and main memory 420 may be connected via a local microprocessor bus, and the mass storage device 430, peripheral device(s) 480, portable storage medium drive(s) 440, and display system 470 may be connected via one or more input/output (I/O) buses.

Mass storage device 430, which may be implemented with a magnetic disk drive or an optical disk drive, is a non-volatile storage device for storing data and instructions for use by the one or more processors 410. Mass storage device 430 may store the system software for implementing embodiments of the present invention for purposes of loading that software into main memory 420.

Portable storage medium drive(s) 440 operates in conjunction with a portable non-volatile storage medium, such as a floppy disk, compact disk, digital video disc, or USB storage device, to input and output data and code to and from the computing device 400 of FIG. 4. The system software for implementing embodiments of the present invention may be stored on such a portable medium and input to the computing device 400 via the portable storage medium drive(s) 440.

User input devices 460 provide a portion of a user interface. Input devices 460 may include an alphanumeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripheral device(s) 480 may include any type of computer support device to add additional functionality to the computer system. Peripheral device(s) 480 may include a modem or a router.

The components provided in the computing device 400 of FIG. 4 are those typically found in computer systems that may be suitable for use with embodiments of the present invention and are intended to represent a broad category of such computer components that are well known in the art. Thus, the computing device 400 of FIG. 4 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Figure 5:
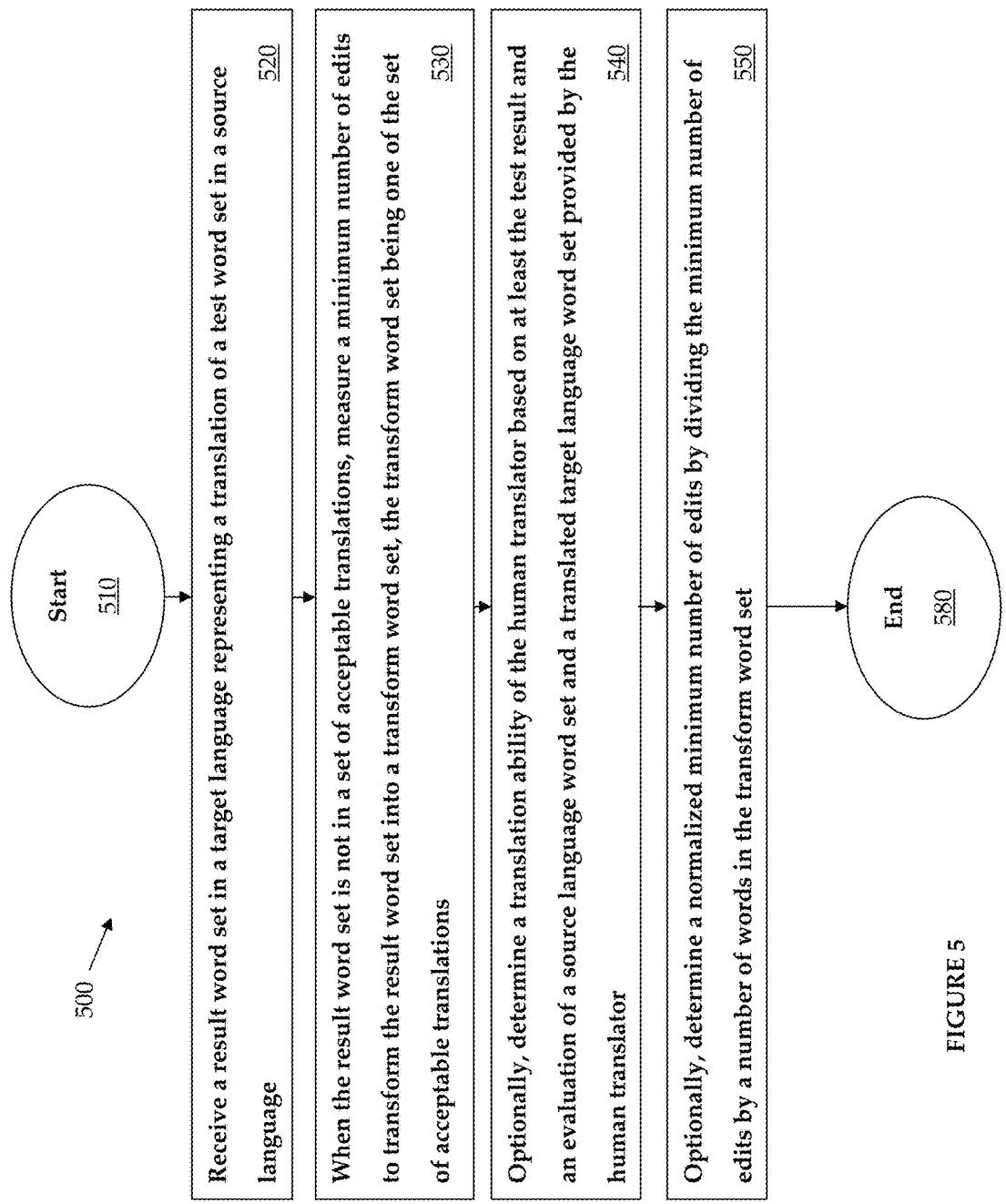
FIG. 5 is a flow chart illustrating an exemplary method.

FIG. 5 illustrates method 500 for evaluating the translation accuracy of a translator. Method 500 starts at start oval 510 and proceeds to operation 520, which indicates to receive a result word set in a target language representing a translation of a test word set in a source language. From operation 520, the flow proceeds to operation 530, which indicates, when the result word set is not in a set of acceptable translations, to measure a minimum number of edits to transform the result word set into a transform word set, the transform word set being one of the set of acceptable translations. From operation 530, the flow proceeds to operation 540, which indicates to, optionally, determine a translation ability of the human translator based on at least the test result and an evaluation of a source language word set and a translated target language word set provided by the human translator. From operation 540, the flow proceeds to operation 550, which indicates to, optionally, determine a normalized minimum number of edits by dividing the minimum number of edits by a number of words in the transform word set. From operation 550, the flow proceeds to end oval 560.

A human translator may provide the result word set, and the method may further include determining a test result of the human translator based on the minimum number of edits.

The method may include determining a translation ability of the human translator based on at least the test result and an evaluation of a source language word set and a translated target language word set provided by the human translator. The method may also include adjusting the translation ability of the human translator based on: 1) price data related to at least one translation completed by the human translator, 2) an average time to complete translations by the human translator, 3) a customer satisfaction rating of the human translator, 4) a number of translations completed by the human translator, and/or 5) a percentage of projects completed on-time by the human translator. In one implementation, the translation ability of a human translator may be decreased/increased proportionally to the 1) price a translator is willing to complete the work—higher prices lead to a decrease in ability while lower prices lead to an increase in ability, 2) average time to complete translations—shorter times lead to higher ability, 3) customer satisfaction—higher customer satisfaction leads to higher ability, 4) number of translations completed—higher throughput lead to higher ability, and/or 5) percentage of projects completed on time—higher percent leads to higher ability. Several mathematical formulas can be used for this computation.

The result word set may be provided by a machine translator, and the method may further include evaluating a quality of the machine translator based on the minimum number of edits.

When the result word set is in the set of acceptable translations, the result word set may be given a perfect score. The minimum number of edits may be determined by counting a number of substitutions, deletions, insertions, and moves required to transform the result word set into a transform word set.

The method may include determining a normalized minimum number of edits by dividing the minimum number of edits by a number of words in the transform word set.

The method may include forming the set of acceptable translations by combining at least a first subset of acceptable translations of the test word set provided by a first translator with a second subset of acceptable translations of the test word set provided by a second translator. The method may also include identifying at least first and second sub-parts of the test word set and/or combining a first subset of acceptable translations of the first sub-part of the test word set provided by the first translator with a second subset of acceptable translations of the first sub-part of the test word set provided by the second translator. The method may further includes combining a first subset of acceptable translations of the second sub-part of the test word set provided by the first translator with a second subset of acceptable translations of the second sub-part of the test word set provided by the second translator and/or combining each one of the first and second subsets of acceptable translations of the first sub-part of the test word set with each one of the first and second subsets of acceptable translations of the second sub-part of the test word set to form a third subset of acceptable translations of the word set. The method may include adding the third subset of acceptable translations to the set of acceptable translations.

The test result may be based on a translation, received from the human translator, of a test word set in a source language into a result word set in a target language. The test result may also be based on a measure of a minimum number of edits to transform the result word set into a transform word set when the result word set is not in a set of acceptable translations, the transform word set being one of the set of acceptable translations.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for reducing processor time and memory during automated scoring of a translation using computation of a hybrid translation edit rate (HyTER) score calculation for a result word set and an exponentially sized reference set in a computing environment, the method comprising:
   receiving a translation hypothesis at a processor of the computing environment, the translation hypothesis comprising a result word set generated by a human or machine translation system in a target language, the result word set representing a translation of a test word set in a source language;
   developing a search space for automated computation of the HyTER score, the search space comprising a lazy composition of:
      a weighted finite-state acceptor (FSA) executable by the processor of the computing environment that represents a set of allowed permutations of the translation hypothesis and associated distance costs, the allowed permutations of the translation hypothesis constructed on demand according to local window constraints on movement of words within a fixed window size,
      the exponentially sized reference set of meaning equivalents encoded as a Recursive Transition Network stored in memory of the computing environment and expanded by the processor of the computing environment on demand, and
      a Levenshtein distance calculation between pairs of the search space comprising allowed permutations of the translation hypothesis and parts of the exponentially sized reference set that do not remain unexpanded, the calculation performed by the processor of the computing environment;
   calculating using the processor of the computing environment the HyTER score for pairs in the search space to identify a pair in the search space having a minimum edit distance, and reducing the number of pairs for the composition for which the Levenshtein distance is calculated to save processor computation time and computer memory used for automated calculations of the HyTER score by constraining a number of paths constructed by the processor on demand by the weighted FSA using the fixed window size, and not constructing permutation paths of the composition outside the window; and
   outputting the HyTER score for the human or machine translation system for the identified pair in the search space having a minimum edit distance, wherein a perfect score indicates that the result word set is an exact match of an acceptable translation in the exponentially sized reference set.

2. The method of claim 1, wherein all permutations of the translation hypothesis would increase the search space to factorial size and make inference NP-complete.

3. The method of claim 2, wherein the result word set is generated by the machine translation system.

4. The method of claim 3, further comprising adjusting a translation ability of a human translator based on at least one of:
   price data related to at least one translation completed by the human translator;
   an average time to complete translations by the human translator;
   a customer satisfaction rating of the human translator;
   a number of translations completed by the human translator; and
   a percentage of projects completed on-time by the human translator.

5. The method of claim 1, wherein the translation hypothesis is provided by a machine translator, and further comprising evaluating a quality of the machine translator based on the minimum number of edits.

6. The method of claim 1, wherein when the translation hypothesis is in a set of acceptable translations of the exponentially sized reference set of meaning equivalents expanded on demand from a reference Recursive Transition Network, the translation hypothesis is given a perfect score.

7. The method of claim 1, further comprising forming a set of acceptable translations by combining at least a first subset of acceptable translations of the test word set provided by a first translator with a second subset of acceptable translations of the test word set provided by a second translator.

8. The method of claim 7, further comprising:
   identifying at least first and second sub-parts of the test word set;
   combining a first subset of acceptable translations of the first sub-part of the test word set provided by the first translator with a second subset of acceptable translations of the first sub-part of the test word set provided by the second translator;
   combining a first subset of acceptable translations of the second sub-part of the test word set provided by the first translator with a second subset of acceptable translations of the second sub-part of the test word set provided by the second translator;
   combining each one of the first and second subsets of acceptable translations of the first sub-part of the test word set with each one of the first and second subsets of acceptable translations of the second sub-part of the test word set to form a third subset of acceptable translations of the test word set;
   and adding the third subset of acceptable translations to the set of acceptable translations.

9. A system, comprising:
   a memory for storing executable instructions; and
   a processor for executing the instructions stored in the memory for developing a search space for automated computation of a hybrid translation edit rate (HyTER) score, the search space, the executable instructions comprising:
      a finite state acceptor executable by the processor to:
         receive a translation hypothesis comprising result word set generated by a human or machine translation system in a target language, the result word set representing a translation of a test word set in a source language;
         construct a set of allowed permutation paths of the translation hypothesis and associated distance costs, the allowed permutations of the translation hypothesis constructed on demand according to local window constraints on movement of words within a fixed window size; and
         output the HyTER score for the human or machine translation system for the identified pair in the search space having a minimum edit distance, wherein a perfect score indicates that the result word set is an exact match of an acceptable translation in an exponentially sized reference set;

a reference recursive transition network executable by the processor to encode acceptable translations as an exponentially sized reference set of meaning equivalents encoded as a Recursive Transition Network stored in memory of a computing environment and expand the reference set on demand;

a one state Levenshtein transducer executable by the processor to calculate a distance between pairs of the search space comprising allowed permutations of the translation hypothesis and the parts of the exponentially sized reference set that do not remain unexpanded, the calculation performed by the processor of the computing environment;

a local window executable by the processor to constrain the movement of words by the finite state acceptor within a window of a fixed size;

a calculator executable by the processor to calculate the HyTER score for pairs in the search space and identify a pair in the search space having a minimum edit distance, the number of pairs for a composition for which the Levenshtein distance is calculated being reduced by constraining a number of paths constructed by the processor on demand by a weighted FSA using the fixed window size, and not constructing permutation paths of the composition outside the window, saving processor computation time and computer memory used for automated calculation of the HyTER score.

10. The system of claim 9, wherein the translation hypothesis is received from a human translator, and wherein the calculator outputs a translation ability of the human translator based on the minimum edit distance.

11. The system of claim 10, wherein a test result is stored in the memory as an indicator of the translation ability of the human translator, and wherein the translation ability of the human translator is adjusted based on at least one of:
   price data related to at least one translation completed by the human translator;
   an average time to complete translations by the human translator;
   a customer satisfaction rating of the human translator;
   a number of translations completed by the human translator; and
   a percentage of projects completed on-time by the human translator.

12. The system of claim 9, further comprising a machine translator interface for receiving the translation hypothesis from a machine translator, wherein a quality of the machine translator is evaluated based on the minimum edit distance.

13. The system of claim 9, wherein when the calculator measures zero, the translation hypothesis is given a perfect score.

14. The system of claim 9, wherein a minimum number of edits to transform the translation hypothesis into a transform word set comprises a minimum number of substitutions, deletions, insertions, and moves, and further comprising a transformer to identify the minimum number of substitutions, deletions, insertions, and moves, the transformer being coupled to the calculator.

15. The system of claim 14, wherein the processor determines a normalized minimum number of edits by dividing a minimum number of edits by a number of words in a transform word set.

16. The method of claim 1, wherein a set of acceptable translations is part of an exponentially sized reference set encoded as the recursive transition network.

17. The method of claim 1, further comprising:
calculating a minimum distance between the translation hypothesis and the permutations of the translation hypothesis in a set of acceptable translations using local-window constraints where words may move within a fixed window based on a length of the translation hypothesis; and
constructing paths of the permutations on demand without constructing parts of the composition of the permutations.

18. The method of claim 1, further comprising:
calculating a minimum Levenshtein distance between the translation hypothesis and a set of acceptable translations using a lazy evaluation without constructing parts of the composition of a standard Levenshtein distance.

19. The method of claim 1, further comprising:
calculating a minimum distance between the translation hypothesis and the permutations of the translation hypothesis in a set of acceptable translations using local-window constraints where words may move within a fixed window based on a length of the translation hypothesis; and
calculating a minimum Levenshtein distance between the translation hypothesis and the set of acceptable translations using a lazy evaluation without constructing parts of the composition of a standard Levenshtein distance.

20. The method of claim 16, further comprising expanding the Recursive Transition Network into a weighted finite state acceptor using a replace operation.

21. A non-transitory computer readable storage media having a program embodied thereon, the program being executable by a processor to perform a method for reducing processor time and memory during automated scoring of a translation using computation of a hybrid translation edit rate (HyTER) score calculation for a result word set and an exponentially sized reference set in a computing environment, the method comprising:
   receiving a translation hypothesis at a processor of the computing environment, the translation hypothesis comprising a result word set generated by a human or machine translation system in a target language, the result word set representing a translation of a test word set in a source language;
   developing a search space for automated computation of the HyTER score, the search space comprising a lazy composition of:
   a weighted finite state acceptor (FSA) executable by the processor of the computing environment that represents a set of allowed permutations of the translation hypothesis and associated distance costs, the allowed permutations of the translation hypothesis constructed on demand according to local window constraints on movement of words within a fixed window size,
      the exponentially sized reference set of meaning equivalents encoded as a Recursive Transition Network stored in memory of the computing environment and expanded by the processor of the computing environment on demand, and
      a Levenshtein distance calculation between pairs of the search space comprising allowed permutations of the translation hypothesis and parts of the exponentially sized reference set that do not remain unexpanded, the calculation performed by the processor of the computing environment;
   calculating using the processor of the computing environment the HyTER score for pairs in the search space to identify a pair in the search space having a minimum edit distance, and reducing a number of pairs for the composition for which the Levenshtein distance is calculated to save processor computation time and computer memory used for automated calculations of the HyTER score by constraining a number of paths constructed by the processor on demand by the weighted FSA using the fixed window size, and not constructing permutation paths of the composition outside the window; and outputting the HyTER score for the human or machine translation system for the identified pair in the search space having a minimum edit distance, wherein a perfect score indicates that the result word set is an exact match of an acceptable translation in the exponentially sized reference set.

22. The method of claim 1, wherein calculating the HyTER score for each of the pairs in the search space further comprises saving computation time and memory by not explicitly constructing parts of the composition.

* * * * *

UNITED STATES PATENT AND TRADEMARK OFFICE
CERTIFICATE OF CORRECTION

| | |
|---|---|
| PATENT NO. | : 10,261,994 B2 |
| APPLICATION NO. | : 13/481561 |
| DATED | : April 16, 2019 |
| INVENTOR(S) | : Daniel Marcu et al. |

It is certified that error appears in the above-identified patent and that said Letters Patent is hereby corrected as shown below:

In the Claims

In Claim 5, Column 14, Line 9, the text currently reads:
-the minimum number of edits.-,
It should read:
--the minimum edit distance.--.

Signed and Sealed this
Thirtieth Day of July, 2019

Andrei Iancu
*Director of the United States Patent and Trademark Office*